United States Patent [19]

Williamson et al.

[11] Patent Number: 5,580,507
[45] Date of Patent: Dec. 3, 1996

[54] METHOD OF MAKING A MOLD AND PARTS FROM THE MOLD

[75] Inventors: Daniel A. Williamson, Hillsboro; Steven R. Castellanos, Tigard; Bruce J. Kilgore, Lake Oswego; John C. Tawney, Portland, all of Oreg.

[73] Assignee: Nike, Inc., Beaverton, Oreg.

[21] Appl. No.: 421,239

[22] Filed: Apr. 13, 1995

Related U.S. Application Data

[62] Division of Ser. No. 166,600, Dec. 17, 1993, Pat. No. 5,435,959.

[51] Int. Cl.$^6$ .......................... B22D 25/00; B29C 39/28
[52] U.S. Cl. .................. 264/221; 249/112; 264/225; 264/244; 264/317; 425/129.2
[58] Field of Search .................. 164/15; 249/112, 249/170, 61; 264/221, 222, 223, 225, 226, 227, 244, 313, 317, 162; 425/119, 129.2, 2

[56] References Cited

U.S. PATENT DOCUMENTS

| | | | |
|---|---|---|---|
| 353,617 | 11/1886 | Banks | 249/135 |
| 2,259,854 | 10/1941 | Langel | 249/135 |
| 2,435,285 | 2/1948 | Lucia | 62/530 |
| 2,820,251 | 1/1958 | Fraser | 425/470 |
| 3,021,572 | 2/1963 | Smith, Jr. | 264/310 |
| 3,058,156 | 10/1962 | O'Connor | 249/95 |
| 3,178,496 | 4/1965 | Ferreira | 264/244 |
| 3,248,468 | 4/1966 | Anderson | 425/451.7 |
| 3,436,781 | 4/1969 | Becka et al. | 264/275 |
| 3,439,384 | 4/1969 | Crossen et al. | 425/119 |

(List continued on next page.)

FOREIGN PATENT DOCUMENTS

| | | | |
|---|---|---|---|
| 303571 | 11/1972 | Austria . | |
| 353142 | 10/1979 | Austria . | |
| 18714 | 11/1980 | European Pat. Off. | 425/129.2 |
| 0273028 | 6/1988 | European Pat. Off. . | |

OTHER PUBLICATIONS

LIM Schuhtechnologie publication (No date).
RE. GE. Co. S.R.L., *Batal Press* publication (No date).
Plaster Mold Casting, pp. 222–237 (No date).
Kennedy, David O., Welch, William O., "Cast Aluminum Segmented Tooling for Low-Pressure Processes", 43rd Annual Conference, Composites Institute, *The Society of the Plastic Industry, Inc.*, Feb. 1–5, 1988, Session 14A/1–3.
Patz, Murray, "Unique Casting Applications With Foam Patterns", *Modern Casting*, L Oct. 1989, pp. 36–37.
"Casting Processes", pp. 332–335 (No date).
Bralower, Paul M., "Wealth of Molding Methods Meet Every Casting Need", *Modern Casting*, Jun. 1989, pp. 53–56.

*Primary Examiner*—Robert Davis
*Attorney, Agent, or Firm*—Banner & Allegretti, Ltd.

[57] ABSTRACT

A method of making a mold from a model is disclosed. A mold carrier is formed having an aperture therein. The aperture has a configuration generally corresponding to the shape of the model. The model is positioned within the aperture such that a space is created between the outer peripheral surface of the aperture and the outer peripheral surface of the model. A resilient first material in its liquid state is poured into the space such that the first material substantially covers the outer peripheral surface of the model. The resilient first material is allowed to solidify in the space such that a resilient mold insert is formed. The mold insert forms an impression of the outer peripheral surface of the model and is disposed along the inner peripheral surface of the aperture. The model is removed from the resilient mold insert. A second material in its liquid state is poured into the aperture of the mold carrier with the resilient mold insert disposed along the inner peripheral surface of the aperture. The second material is allowed to solidify such that a duplicate of the model is formed. The duplicate replicates the outer peripheral surface of the model because of its contact with the resilient mold insert. The duplicate is removed from the resilient mold insert. A mold is formed from the duplicate. The mold formed is used in making replicas of the model.

14 Claims, 10 Drawing Sheets

U.S. PATENT DOCUMENTS

| | | | |
|---|---|---|---|
| 3,463,849 | 8/1969 | Winkler | 425/129.2 |
| 3,504,079 | 3/1970 | Hall | 264/225 |
| 3,510,914 | 5/1970 | Hujik | 425/166 |
| 3,635,658 | 1/1972 | Ferri et al. | 423/263 |
| 3,670,070 | 6/1972 | Appleton | 264/46.4 |
| 3,718,726 | 2/1973 | Taylor | 264/219 |
| 3,813,201 | 5/1974 | Fredrick et al. | 425/129.2 |
| 3,838,956 | 10/1974 | Schmidt | 425/119 |
| 3,840,310 | 10/1974 | Klee et al. | 425/129.2 |
| 3,974,996 | 8/1976 | Violet | 249/173 |
| 4,072,673 | 2/1978 | Lammers | 264/225 |
| 4,087,573 | 5/1978 | Holcombe, Jr. et al. | 106/73.2 |
| 4,238,467 | 12/1980 | Dugan et al. | 423/263 |
| 4,386,056 | 5/1983 | Heytmeijer | 423/263 |
| 4,432,948 | 2/1984 | Heytmeijer | 423/21.5 |
| 4,650,625 | 3/1987 | Pentlow | 264/225 |
| 4,650,652 | 3/1987 | Naitou et al. | 423/21.1 |
| 4,703,806 | 11/1987 | Lassow et al. | 164/518 |
| 4,731,939 | 3/1988 | Parracho et al. | 36/31 |
| 4,799,530 | 1/1989 | Sturgis et al. | 164/5 |
| 4,815,516 | 3/1989 | Sturgis et al. | 164/529 |
| 4,860,815 | 8/1989 | Parker et al. | 264/225 |
| 4,864,736 | 9/1989 | Bierk | 2/245 |
| 5,013,228 | 5/1991 | Thornthwaite et al. | 425/2 |

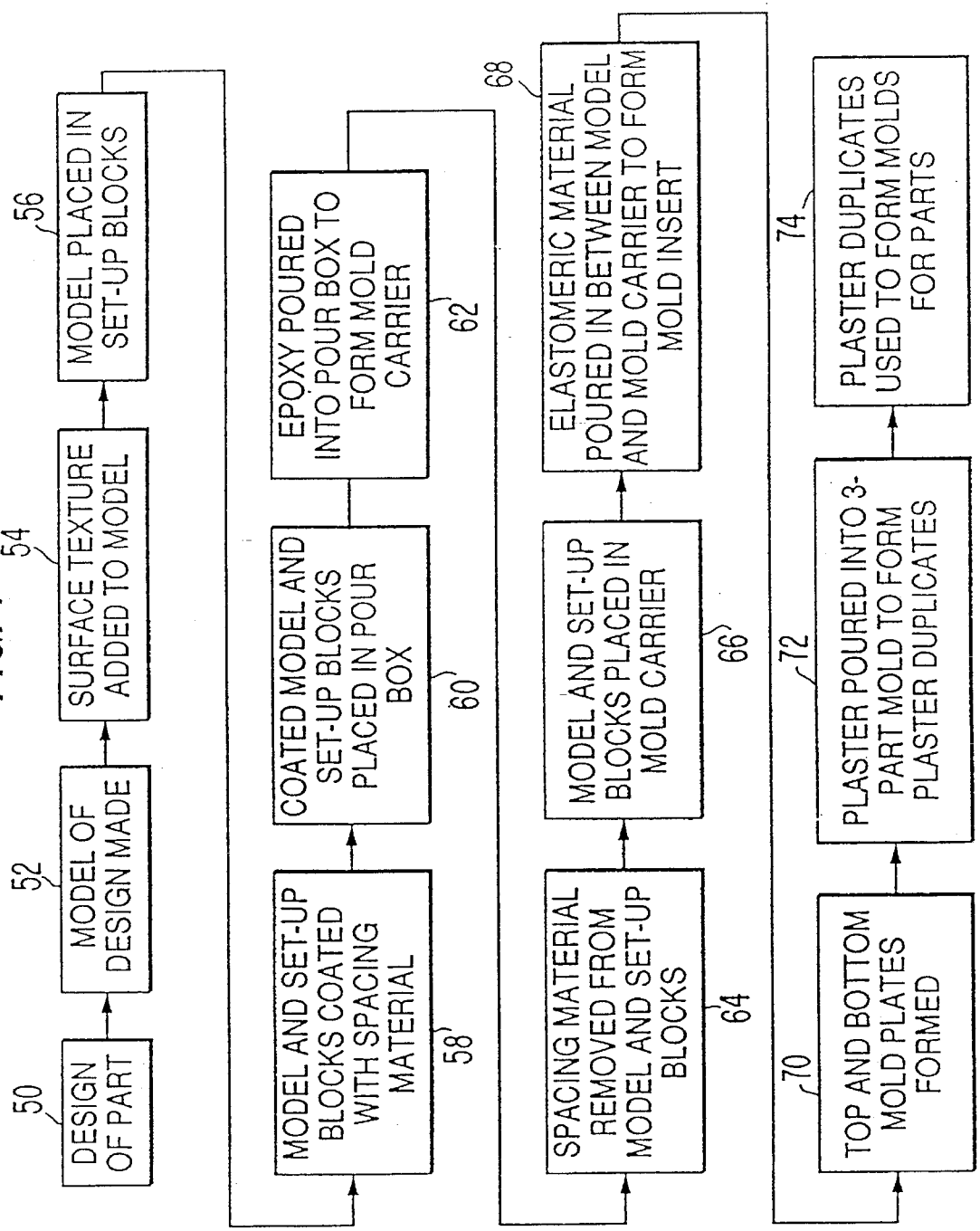

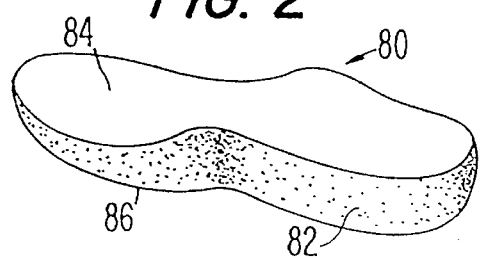
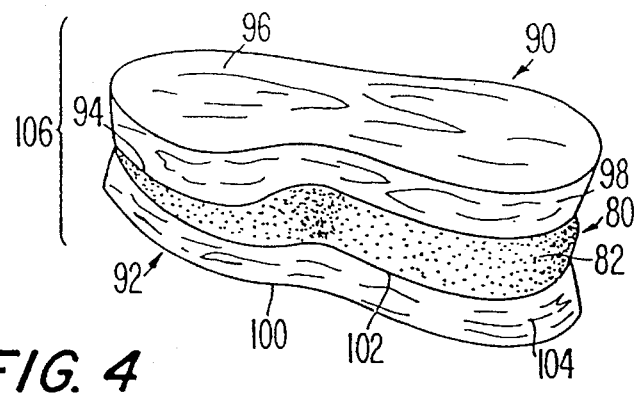
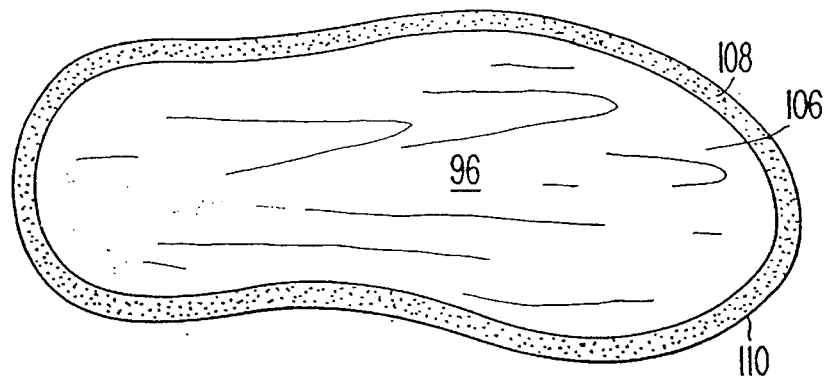
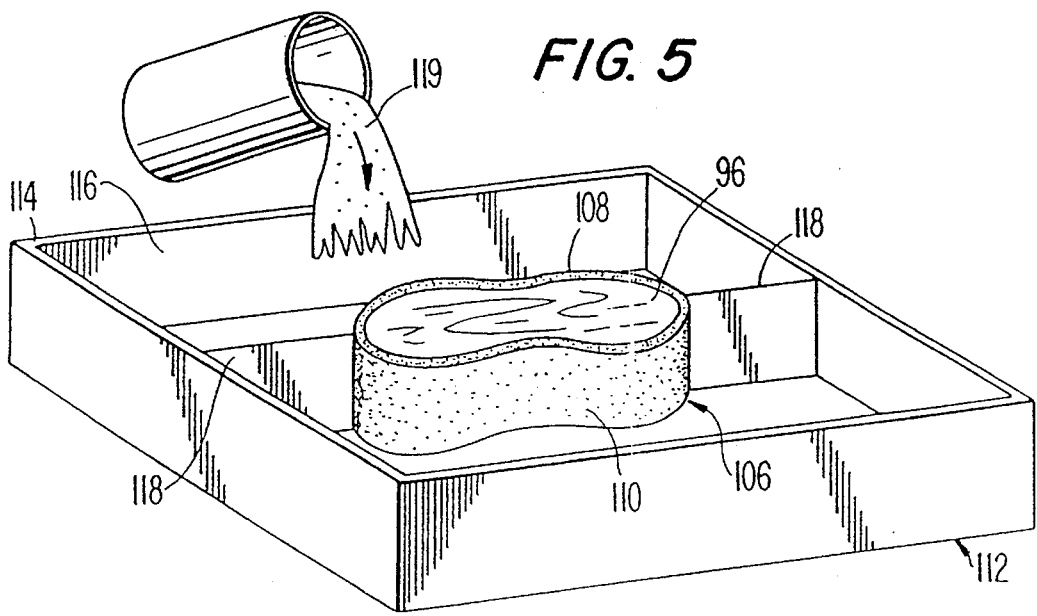

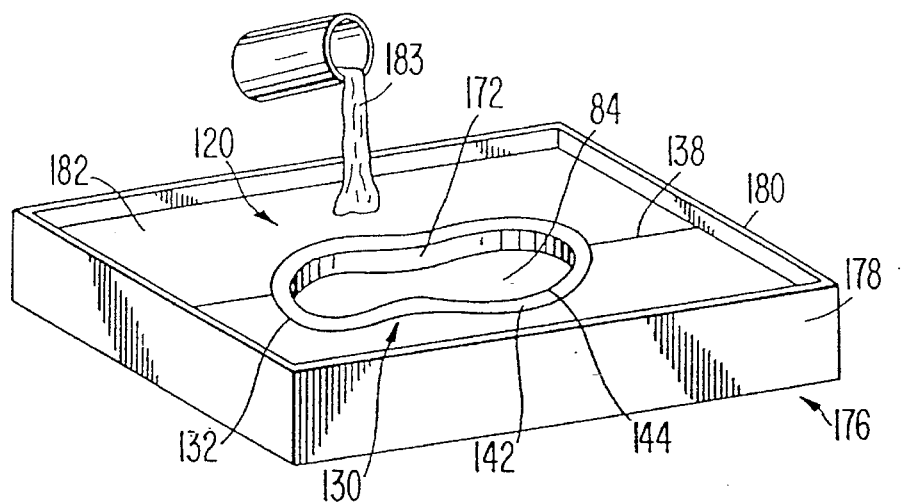
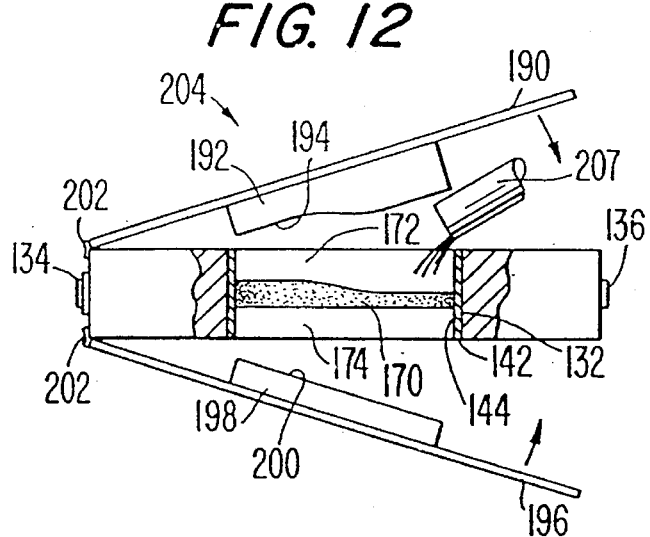
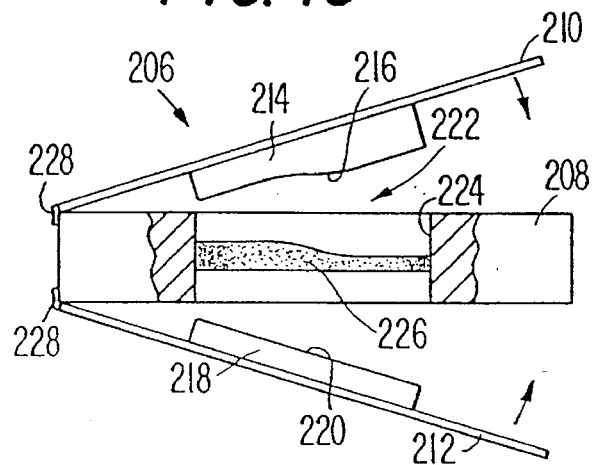

5,580,507

METHOD OF MAKING A MOLD AND PARTS FROM THE MOLD

This application is a division of application Ser. No. 08/166,600, filed Dec. 17, 1993 and now U.S. Pat. No. 5,435,959.

BACKGROUND OF THE INVENTION

1. Field of the Invention

The present invention is directed to a method of making a mold for replication of a part or article from a design, and in particular, the method includes making a model of the part from the design and creating a mold of the part from the model, and thereafter making a part in the mold.

2. Description of the Prior Art

Generally numerous methods are known for making a mold from a three-dimensional model of a part design. For example, in the shoe manufacturing industry, a shoe part, for example a shoe midsole, is typically first designed or drawn on paper in a two-dimensional format and then typically made into a three-dimensional model. Shoe midsoles have an outside peripheral surface which is normally contoured and detailed and which has various areas of surface texturing, for example, stippling or raised ribs. The three-dimensional model made of a midsole design typically has the general shape of the midsole but does not normally have the surface texturing applied thereto, the surface texturing comprising an important part of the midsole design. The midsole model without surface texturing is then typically used to create a master mold. With reference to FIGS. 23 and 24, prior art master mold 20 typically has two separable members 22 and 24 and is typically made out of a metal, for example, aluminum or steel. Members 22 and 24 are separated along parting line 26 and share an aperture 28 partly disposed in each of the members. As best shown in FIG. 24, aperture 28 has inner peripheral surface 30. Inner peripheral surface 30 has contoured portion 32 which is an impression of the contoured outer peripheral surface of the shoe midsole model. However, this impression typically does not exhibit the surface texturing that is part of the midsole design.

Mold members 22 and 24 are bolted together by fastening bolt 34. Master mold 20 typically has upper mold plate 36 and lower mold plate 38. Lower mold plate 38 has mold protrusion 40 with upper surface 42 which has an impression corresponding to the lower surface of the midsole model. Mold protrusion 40 has the same general perimeter shape as the midsole model. When lower mold plate 38 is positioned on the bottom surfaces of mold members 22 and 24 as indicated by the arrows in FIG. 24, mold protrusion 40 fills the portion of aperture 28 below the contoured portion 32 of inner peripheral surface 30. Upper mold plate 36 has mold protrusion 44 with bottom surface 46 which has an impression corresponding to the upper surface of the midsole model. Mold protrusion 44 has a perimeter shape that corresponds to the perimeter shape of the midsole model. When upper mold plate 36 is positioned on the upper surface of mold members 22 and 24 as indicated by the arrows in FIG. 24, protrusion 44 is positioned such that it fills the portion of aperture 28 above contoured portion 32 of inner peripheral surface 30. Thus, when lower mold plate 38 and upper plate 36 are positioned on mold members 22 and 24, an inner space is created which replicates the midsole model. After master mold 20 has been made from the midsole model, the midsole model is typically discarded or put into storage.

Duplicates models which replicate the midsole model are now made using master mold 20. The duplicates are typically made out of a plaster material. Generally, master mold members 22 and 24 are bolted together and lower mold plate 38 is positioned on the bottom thereof. Plaster in its liquid form is then poured into aperture 28. Thereafter, upper mold plate 36 is positioned on top of mold members 22 and 24. The plaster is then allowed to solidify such that a plaster duplicate of the midsole model is made. The plaster duplicate is removed from master mold 20 by removing upper and lower mold plates 36 and 38 and by loosening bolts 34 such that mold members 22 and 24 can be separated to release the plaster duplicate.

Because of parting line 26 between mold members 22 and 24, a plaster duplicate produced from master mold 20 will have a flash line on its forward end and its rearward end corresponding to where part line 26 intersects aperture 28. These flash lines on the plaster duplicate must be removed before the plaster duplicate can be used to make a production mold for the finished shoe midsole. Typically, numerous plaster duplicates are created using master mold 20. On each of the duplicates created the flash lines on the forward and rearward ends must be removed. Such removal typically is done by hand and thus is relatively time consuming and expensive. Further, if a metal master mold is made to include impressions of surface texturing on its molding surface such that a plaster duplicate made from the master mold has surface texturing thereon, the removal of the flash lines from the plaster duplicate likely will damage the surface texturing on the duplicate (especially in the areas of the flash lines), thus, requiring reworking or reapplying of the surface texturing to the duplicate. Additionally, in a metal master mold made with impressions of surface texturing, the intricately detailed surface texturing of a plaster duplicate formed thereon can be damaged by the unyielding metal master mold when the duplicate is removed from metal master mold.

Once a number of plaster duplicates have been made from master mold 20, the duplicates are then used to make a number of production molds for manufacturing finished midsoles. The number of production molds of the midsole design needed depends upon the number of parts to be manufactured and the speed with which they must be produced. Typically, the plaster duplicates are used to make cast aluminum molds of the midsole design. That is, the plaster duplicates are encased in molten aluminum which is allowed to harden, and thereafter, the plaster duplicate is destroyed such that all that remains is the aluminum production mold with a mold impression left by the plaster duplicate, the mold impression corresponding to the midsole design.

As described above, the midsole model, and thus the plaster duplicates made therefrom, typically do not reflect the surface texturing of the midsole design. Therefore, surface texturing needs to be added to each of the aluminum production molds made from the plaster duplicates. The surface texturing is typically applied manually, and thus, is labor intensive and costly and leads to each aluminum mold being slightly different from the others. Therefore, depending upon which production mold a shoe part is manufactured from, the surface texturing may be slightly different from midsole to midsole.

Typically, ethylene vinyl acetate (EVA) or polyurethane (PU) is poured into the aluminum production molds to make the final shoe midsole.

The prior art method described above requires the labor intensive removal of the flash lines from the plaster duplicates. Further, the method produces production molds which are all slightly different from the other because of the surface texturing being applied to each mold individually by hand.

The use of an elastomeric or resilient material as a part or portion of a mold is generally known. In aluminum production molds used to make shoe midsoles, resilient mold parts are sometimes used to isolate a structure to be imbedded in the midsole to prevent the EVA or PU from covering the structure such that the structure is allowed to be visible along the outer peripheral surface of the midsole. For example, an elastomeric gasket is sometimes used to protect a transparent air bladder such that portions of the transparent bladder are visible along the periphery of the midsole after the midsole has been formed. The elastomeric gasket is positioned along a portion of the molding surface of the aluminum production mold such that it tightly engages portions of the transparent bladder to prevent liquid EVA or PU from seeping therebetween, and thus, allowing the portions of the bladder engaged by the gasket to be visible along the periphery of the finished midsole.

Still furthermore, U.S. Pat. No. 3,838,956; European Patent No. 0,273,028; and Austrian Patent No. 353,142 all disclose the use of an elastomeric mold part for preventing a flash line on the rear or heel end of a finished shoe sole. These references appear to generally disclose the forming of a shoe sole on a shoe upper using an injection molding process and the use of an elastomeric mold member to prevent a flash line on the rear of the sole of the finished shoe. U.S. Pat. No. 3,504,079 discloses using an elastomeric material to make a mold for a shoe sole such that the mold can be used to form a shoe sole on an upper. The elastomeric properties of the material allow the entire finished shoe to be removed from the mold. U.S. Pat. No. 3,974,996 discloses a method of making a final production mold for the contoured outer surface of a candle by encasing a candle mandrel in a shell and pouring an elastomeric material in an annular space formed between the mandrel and the shell. The patent discloses that the mold-making process can be used for devices having varying and/or otherwise irregular cross sections.

All of the above references generally disclose the use of an elastomeric mold part in a final or production mold used to produce the actual manufactured article. As is apparent, when hundreds or thousands of articles are produced using production molds with elastomeric parts, the elastomeric parts of the mold may deteriorate, and thus, result in inconsistencies and defects in the manufactured articles or parts. Further, elastomeric mold parts in production molds can be unsuitable to resist the heat and pressure required for molding many articles or parts. Further, if numerous molds are required to increase the rate of manufacturing articles or parts, final production molds using elastomeric parts may be unacceptable because of the complexity and cost of producing such molds.

SUMMARY OF THE INVENTION

The present invention is directed to a method of making a mold from a model of an article. A mold carrier is formed with an aperture therein and the aperture has a configuration generally corresponding to the shape of the model. The model is positioned within the aperture such that a space is created between an inner peripheral surface of the aperture and an outer peripheral surface of the model. A resilient fast material in its liquid state is poured in the space such that the fast material substantially covers the outer peripheral surface of the model. The resilient first material is allowed to solidify in the space such that a resilient mold insert is formed. The mold insert forms an impression of the outer peripheral surface of the model and is disposed along the inner peripheral surface of the aperture. The model is removed from the resilient mold insert by deforming the mold insert. A second material is poured in its liquid state into the aperture of the mold carrier with the resilient mold insert disposed along the inner peripheral surface of the aperture. The second material is allowed to solidify such that a duplicate of the model is formed. The duplicate replicates the outer peripheral surface of the model because of its contact with the resilient mold insert. The duplicate is removed from the resilient mold insert by deforming the mold insert. A mold is formed from the duplicate. The mold formed is used in making replicas of the model.

The present invention can further include the making of a part or article using a production mold formed by the duplicate. A material is positioned in the production mold and allowed to set therein to form the part or article. The part or article is then removed from the production mold.

The present invention further includes a method of making a mold carrier with a resilient mold insert. The outer peripheral surface of a model is covered with a layer of spacing material. The model with the spacing material applied thereto is placed in a pour box. A first material in its liquid state is poured into the pour box such that the first material surrounds the model and spacing material. The first material is allowed to solidify in the pour box. The model and spacing material are removed from the pour box such that a mold carrier with an aperture disposed therein is formed. The aperture has a configuration generally corresponding to the shape of the model. The spacing material is removed from the model. The model is positioned within the aperture such that a space is created between the inner peripheral surface of the aperture and the outer peripheral surface of the model. A resilient second material in its liquid state is poured into the space such that the second material substantially covers the outer peripheral surface of the model. The resilient second material is allowed to solidify in the space such that a resilient mold insert is formed. The mold insert forms an impression of the outer peripheral surface of the model and is disposed along the inner peripheral surface of the aperture. The model is removed from the resilient mold insert by deforming the mold insert.

The present invention can further include the step of applying a surface texturing to the three-dimensional model of the part design.

The present invention further includes a method of making a part from a destructible duplicate of the part design. A mold base is formed having an aperture therein. The aperture has a configuration generally corresponding to the shape of the duplicate. The duplicate is positioned within the aperture such that a space is created between an inner peripheral surface of the aperture and an outer peripheral surface of the duplicate. A fast material is poured in its liquid state into the space such that the first material substantially covers the outer peripheral surface of the duplicate. The first material is allowed to solidify in the space such that a rigid mold insert is formed. The rigid mold insert has an impression of the outer peripheral surface of the duplicate. The rigid mold insert is removed from the mold base. The destructible duplicate is removed from the rigid mold insert by destroying the duplicate. A production mold is formed with an aperture therein. The aperture of the production mold has a configuration generally corresponding to the shape of the outer peripheral surface of the rigid mold insert. The rigid mold insert is placed into the aperture of the production mold. A second material is placed into the rigid mold insert when it is disposed in the aperture of the production mold. The second material is allowed to set in the rigid mold insert such that a part is formed. The part is removed from the rigid mold insert.

The present invention provides the advantage of making an exact duplicate of a three-dimensional model for use in making final production molds of the model such that flash lines are reduced or eliminated on the duplicate. Thus, with the present invention, expensive manual labor to remove the flash lines from the duplicate before it is used to make a mold can be reduced or entirely eliminated. Further, the present invention allows a duplicate to be made which exactly reflects the surface texturing of the original model. Thus, the final production mold or molds will have the exact same surface texturing as the model and the expense and inconsistencies associated with applying surface texturing to numerous final production molds can be eliminated. Additionally, the present invention provides for the expeditious, inexpensive and easy manufacturing of numerous production molds for exactly replicating an article or part. These production molds are made using the model duplicates which exactly reflect the original model of the article or part and thus the original design of the article or part. The final production molds made from the model duplicates are relatively inexpensive, quickly and easily manufactured and durable such that numerous articles or parts can be made using the molds.

The present invention further provides the advantage of the easy and expeditious making or manufacturing of a mold carrier with a resilient mold insert.

The present invention further provides the advantage of making of a production mold which can be used for the manufacture of different midsole styles by interchanging components of the production mold.

DESCRIPTION OF DRAWINGS

FIG. 1 is a flow chart demonstrating the steps of the preferred method of the present invention.

FIG. 2 is a top perspective view of a three-dimensional model of a shoe midsole design.

FIG. 3 is a top perspective view of the model of FIG. 2 positioned between an upper set-up block and a lower set-up block.

FIG. 4 is a top plan view of the combination of the model and set-up blocks in FIG. 3 with spacing material disposed therearound.

FIG. 5 is a top perspective view of a pour box with the combined structure of FIG. 4 disposed therein and demonstrating the forming of a mold carrier.

FIG. 11 is a top perspective view showing the mold carrier and resilient mold insert of FIG. 8 with the model and lower set-up block disposed therein and demonstrating the forming of an upper mold plate model.

FIG. 12 is a side elevational view and partial section of the mold carrier and resilient mold insert of FIG. 8 with an upper and lower mold plate and demonstrating the forming of a model duplicate.

FIG. 13 is a side elevational view and partial section of a production mold made from a model duplicate and for producing actual midsoles which are replicas of the midsole model of FIG. 2.

FIG. 22 shows a partial section generally along line 22—22 of FIG. 21 and further shows the production mold in a closed position.

DETAILED DESCRIPTION OF THE PREFERRED EMBODIMENTS

Figure 6:
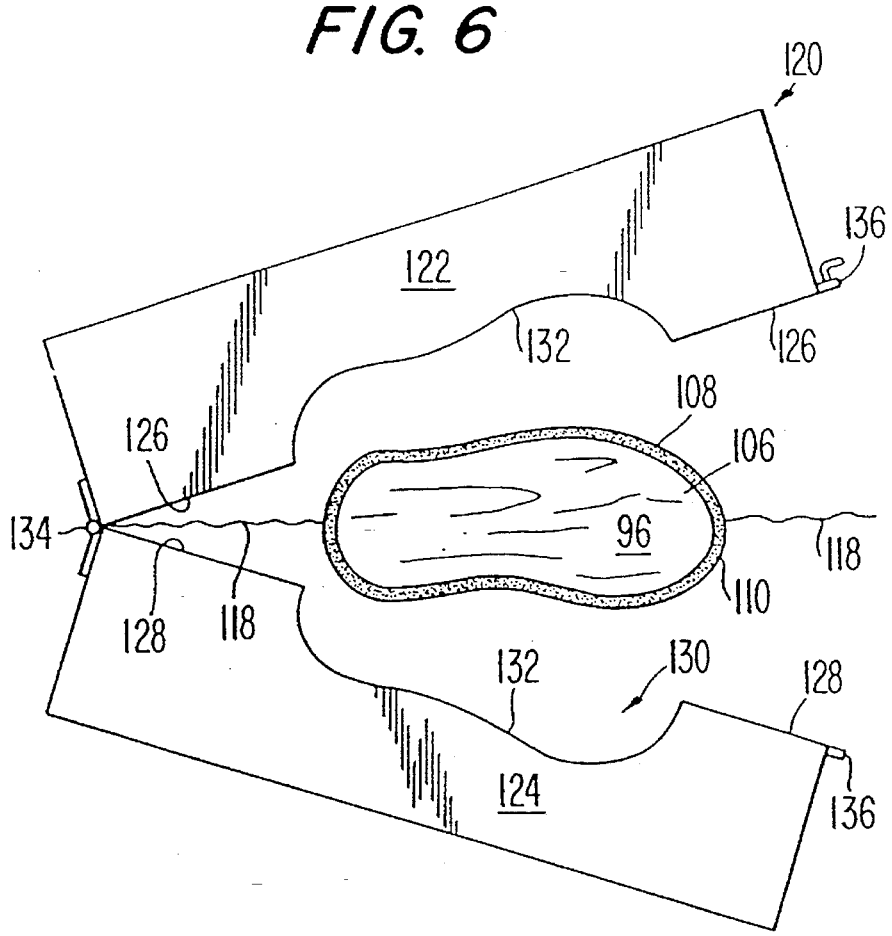
FIG. 6 is a top plan view demonstrating the release of the combined structure of FIG. 4 from a formed mold carrier.

FIG. 1 is a flow chart demonstrating the steps of transforming a design of an article or part into a production mold or molds from which replicas of the part or article design can be manufactured. The method of the present invention allows articles or parts to be manufactured accurately and consistently from the beginning design of such article or part. The method reduces manual labor and manufacture time, thus, reducing mold-making costs and improving the quality and consistency of the articles or parts produced. The method of the present invention will be described below for the manufacturing of a shoe midsole. As is apparent, other parts of a shoe, for example outsoles, can be manufactured using the method. Further, the method can additionally be applied to different types of manufacturing, for example, the manufacture of toys, medical equipment, jewelry, and aircraft and automotive parts.

The fast step in the present method is to design the part or article to be manufactured. This step is generally designated by the reference number 50 in FIG. 1. For example, the design of a midsole is created by a designer and can exist in two-dimensional sketch form on paper. The designer can also create his design in the form of a three-dimensional prototype, for example, sculpted in clay. The designer can further formulate his or her design as a two- or three-dimensional computer model. Preferably, the designer will generate his or her design directly into a three-dimensional computer environment early in the design and development process. In any event, whatever form the design of the shoe midsole is recorded in, the design reflects the contoured and detailed outer peripheral surface of the midsole and the surface texturing to be applied to the visible outer peripheral surfaces of the midsole.

After the design of the midsole or other article has been generated, a three-dimensional model of the design is then made. This step is generally indicated by the reference numeral 52 in FIG. 1. FIG. 2 depicts a model 80 made from a shoe midsole design. Model 80 has the general shape of a shoe midsole with a contoured outer peripheral surface 82. Model 80 has upper surface 84 and lower surface 86. Three-dimensional model 80 can be made out of various materials, for example wax, wood, high density foam, silicone or any other kind of elastomer, RENSHAPE® (manufactured by Ciba-Geigy of Redman, Wash.), or DYNACAST® (manufactured by Kindt-Collins of Cleveland, Ohio). Preferably, model 80 is made of aluminum or any other suitable metal. The three-dimensional model can be manually made by skilled artisans. However, preferably, the design of the shoe midsole is entered into a computer system to create a three-dimensional computer model of the design, if this has not already been done at the previous design stage. An example of three-dimensional computer surface modeling software is the CAMAX® system manufactured by Camax Systems, Inc. of Minneapolis, Minn. Alternatively, the shoe midsole design can be entered into a two-dimensional wire frame software system, for example the CADKEY® system manufactured by Cadkey, Inc. of Windsor, Conn. As is apparent, the shoe midsole design may have already been created directly onto a two-dimensional or three-dimensional computer software system.

Typically, the actual location where three-dimensional model 80 is created is different than the location where the shoe midsole is designed. Thus, the fact that the midsole design is created on a computer makes the transfer of the design to the model making location simple and efficient by having the locations electronically connected or by transferring data storage devices. Preferably, once the design has been stored in a three-dimensional surface modeling system, for instance the CAMAX® system, the system can be used to manipulate a computer driven numerical control milling machine to create a three-dimensional aluminum model of the shoe design. An example of a numeral control milling machine compatible with the CAMAX® surface modeling software is the FADAL CNC® milling machine manufactured by Fadal, Inc. of North Hollywood, Calif. The three-dimensional aluminum model typically made by the milling machine has a smooth outer peripheral surface 82. In other words, the milling machine typically cannot apply the surface texturing which forms a part of the midsole design. However, it is foreseeable that, in the future, milling machines may become available that will be able to apply surface texturing. The model 80 shown in FIG. 2 has surface texturing added to its outer peripheral surface 82. This surface texturing is not present when model 80 leaves the milling machine, but is added in a later step, as will be described below.

Other alternative methods can be used to manufacture the three dimensional model. For example, three-dimensional computer information can be used to create a three-dimension model using a laser and a light-sensitive elastomer which sets or hardens upon being exposed to the laser light. Generally, the laser light makes numerous slices or passes through the light sensitive elastomer such that a thin layer of elastomer is hardened with each pass so that eventually a three-dimensional object is formed or grown. An example of such a system is the STEREOLITHOGRAPHY® system manufactured by 3D System, Inc. of Valencia, Calif. Another alternative method of manufacturing a three-dimensional model is the use of three-dimensional computer information to cut thin layers of paper-like material into two-dimensional configurations and adhesively attach the two-dimensional configurations one on top of the other to build or grow a three-dimensional object. An example of this type of system is Laminated Object Manufacturing (LOM) manufactured by Helisys, Inc. of Torrance, Calif. The above alternative processes of making three-dimensional models of a design are generally referred to as rapid prototyping systems because of the speed with which a prototype can be made.

As described above, three-dimensional aluminum model 80 typically has smooth surfaces after it has been milled. Thus, the surface texturing which is part of the midsole design needs to be added to the appropriate portions of outer peripheral surface 82 of midsole model 80. This step is generally indicated by the reference numeral 54 in FIG. 1. Model 80 shown in FIG. 2 has a stippled or grainy surface texture applied to its entire outer peripheral surface. As is apparent, the surface texturing can be applied to only a part of the outer peripheral surface of model 80. The surface texturing can be done by hand labor, for example with sandpaper, hand stippling, or by adhering textured materials to the model. However, it is preferable that the surface texturing be done by an acid etching process. Such an acid etching process includes the selection of visual texture standards. The desired texture is then typically applied to the aluminum or metal model in the form of a wax or carbon mask. The model is then dipped in one or more acid and/or rinse baths until the desired textures are created at the desired locations. The aluminum model can then be scoured cleaned with the use of glass beads. Such an acid etching system is disclosed in U.S. Pat. No. 3,052,581 which is hereby incorporated herein by reference. The acid etching process disclosed in the above patent is generally known as the MOLD-TECH® system manufactured by Roehlen Industries of Walnut, Calif. Thus, the surface texturing is applied only once to the three-dimensional master model 80 of the shoe midsole in contrast to the prior art methods wherein the surface texturing is typically applied to each of the numerous production molds used to manufacture the final article or part.

The surface texturing is described above as being applied to an aluminum model, however, any other metal or other suitable material of which the model is made could have the surface texturing applied thereto.

After the appropriate surface texturing has been applied to model 80, the model is then placed in set-up blocks. This step is indicated by the reference numeral 56 in FIG. 1. FIG. 3 shows model 80 with an upper set-up block 90 disposed on its upper surface 84 and a lower set-up block 92 disposed on its lower surface 86. Upper set-up block 90 has a lower surface 94, upper surface 96, and outer peripheral surface 98. Lower set-up block 92 has lower surface 100, upper surface 102 and outer peripheral surface 104. Lower surface 94 of upper set-up block 90 covers upper surface 84 of model 80 and upper surface 102 of lower set-up block 92 covers lower surface 86 of model 80. The upper and lower set-up blocks 90 and 92 can be attached to model 80 by a suitable releasable adhesive, for example SUPER-77® manufactured by 3M Company of St. Paul, Minn. The set-up blocks 90 and 92 can also be mechanically attached to model 80 by, for example, bolts. The set-up blocks are used so that model 80 can be properly positioned within a mold or pour box to create the needed mold structures as will be more fully described below. Flat lower surface 100 of lower set-up block 92 and flat upper surface 96 of upper set-up block 90 provide resting surfaces for positioning the combination of the set-up block and model in a pour box or mold structure.

The set-up blocks are typically made out of wood, however, they can be made out of any other suitable material, for instance plastic. The combined structure of model 80 with upper set-up block 90 and lower set-up block 92 attached thereto is generally indicated by the reference numeral 106.

Model 80 with set-up blocks 90 and 92 attached thereto is then covered with a spacing material. This step is generally indicated by the reference numeral 58 in FIG. 1. With reference to FIG. 4 which is a top plan view of the combined structure 106, spacing material 108 is applied around the perimeters of model 80 and upper and lower set-up blocks 90 and 92 such that it covers contoured outer peripheral surface 82 of model 80, outer peripheral surface 98 of upper set-up block 90, and outer peripheral surface 104 of lower set-up block 92. Spacing material 108 is preferably applied in a continuous layer that is approximately ¼ to ⅜ inches in thickness completely around the outer peripheral surfaces of model 80 and set-up blocks 90 and 92. Spacing material 108 protects model 80 and set-up blocks 90 and 92 during the forming of the epoxy mold carrier in a step that is described below. Spacing material 108 also serves to define the thickness of the resilient mold insert that is formed in a step which is also described below.

Spacing material 108 can be made of wax, clay, or any other suitable material. Further, spacing material 108 can be a foam material with adhesive backing disposed on one side such that it can be applied to the outer peripheral surfaces of the model and the set-up blocks. Outer surface 110 of spacing material 108 can then be treated with a demolder or release agent, for example a silicone spray. The demolder insures that spacing material 108 does not stick to the epoxy mold carrier as it is formed in a later step described below.

The combination structure of model 80 and set-up blocks 90 and 92 covered with spacing material 108 is then placed in a pour box or form. This step is generally indicated by the reference numeral 60 in FIG. 1. With reference to FIG. 5, the pour box or form 112 has a generally rectangular shape with a rectangular-shaped perimeter wall 114. Perimeter wall 114 has inner surface 116 which defines a generally rectangular space inside pour box 112. Pour box 112 may or may not have a bottom or base. If it does not have a base, the pour box can simply be positioned on any solid flat surface upon which a release material or agent has been applied.

The combined structure of aluminum model 80 and upper and lower set-up blocks 90 and 92 covered with spacing material 108 is then placed generally in the center of pour box 112. The combined structure of the model, set-up block, and spacing material is positioned in pour box 112 such that flat bottom surface 100 of lower set-up block 92 rests on the bottom of the pour box or, if the pour box does not have a bottom, on the flat underlying support surface on which the pour box rests.

The inside surface 116 of pour box 112 is then coated with a demolder or a release agent, such that when epoxy is poured into the pour box it will not stick to perimeter wall 114. Release papers 118 can also be positioned within the pour box such that the formed epoxy mold carrier will have a parting line. Release papers 118 extend from opposite sides of perimeter wall 114 to the corresponding opposite sides of the combined structure of the model, set-up blocks and spacing material. Release papers 118 can be held in position by any suitable means, for example adhesive or glue. Alternatively, an epoxy mold carrier can be created without a parting line in which case release papers 118 would not be used.

After the combined structure of the model 80, set-up blocks 90 and 92, and spacing material 108 are in position, an epoxy material 119, or any other suitable material, is poured in its liquid state to the level of upper surface 96 of upper set-up block 90. This step is generally indicated by the reference numeral 62 in FIG. 1. As is apparent, when release papers 118 are present within pour box 112, the epoxy material must be poured into both halves of the interior surface of pour box 112 created by release papers 118.

As discussed above, if a parting line in the epoxy mold carrier is not desired, the epoxy material can simply be poured such that it surrounds the combined structure of the model, set-up blocks and spacing material.

The epoxy material can be of any suitable variety for example SY6018, manufactured by Anchor Seal Epoxy Products of Danvers, Mass. After the epoxy material has been poured to the desired level in the pour box, it is allowed to cure or harden. After the epoxy material has hardened or solidified, the pour box is removed from the formed mold carrier 120 and the combined structure of model 80 and upper and lower set-up blocks 90 and 92 covered with spacing material 108 is also removed from mold carrier 120 as is diagrammatically shown in FIG. 6.

With reference to FIG. 6, release papers 118 are also removed such that mold carrier 120 is formed into two separable members 122 and 124. Separable members 122 and 124 have adjoining surfaces 126 and 128 which contact one another when separable members 122 and 124 are in a closed position. When separable members 122 and 124 are in a closed position such that engaging surfaces 126 and 128 are in contact, aperture 130 is formed in the mold carrier. As is apparent, aperture 130 has the general enlarged shape of the midsole model because it was formed using the model 80 coated with spacing material 108. Each separable member 122 and 124 has disposed therein a portion of aperture 130. Aperture 130 has an inside peripheral surface 132. As shown in FIG. 6, when separable members 122 and 124 are in an open position such that engaging surfaces 126 and 128 do not contact one another, one portion of inside peripheral surface 132 is located on separable member 122 and the other portion of inside peripheral surface 132 is located on separable member 124. Separable members 122 and 124 can be connected by hinge 134 such that the separable members can be rotated in between an open position and a closed position. Latch 136 can be disposed on the separable members to hold them in a closed position when the latch is in a closed position. Separable members 122 and 124 can be held in their closed position by any other suitable means for example clamps, straps or bolts. The mating of engaging surfaces 126 and 128 when mold carrier 120 is in a closed position forms parting line 138 of the mold carrier.

Additionally, the mold carrier can be made with numerous parting lines by positioning additional release papers or agents in the pour box when the mold carrier is formed. Each of the parting lines typically will intersect the aperture in the mold carrier and form three or more separable members.

Alternatively, as described above, the mold carrier can be made of a single member without a parting line such that an aperture having a configuration generally conforming to the enlarged shape of model 80 is formed. In this alternative mold carrier, after the epoxy material has set or cured, the malleability of the spacing material 108 allows the combined structure of the model, set-up blocks and spacing material to be removed from the aperture formed in the carrier.

After mold carrier 120 has been formed by the epoxy material with aperture 130 therein, spacing material 108 is removed from the outer peripheral surfaces of model 80 and upper and lower set-up blocks 90 and 92. This step is indicated by the reference numeral 64 in FIG. 1. The type of method used to remove spacing material 108 will depend upon what it is made of. For instance, clay can be scraped off the peripheral surfaces, water soluble wax can be dissolved off of the peripheral surfaces, and adhesive-backed foam can simply be peeled off the peripheral surfaces. Model 80 is still positioned in between and attached to upper and lower set-up blocks 90 and 92 after spacing 108 has been removed.

After spacing material 108 has been removed from the combined structure of model 80 and set-up blocks 90 and 92, the combined model and set-up blocks are then positioned in aperture 130 of mold carrier 120 with mold carrier 120 in its closed position. This step is generally indicated by reference numeral 66 in FIG. 1. Mold carrier 120 is in its closed position when engaging surfaces 126 and 128 of separable members 122 and 124, respectively, are engaging one another to form part line 138 and latch member 136 is actuated to its closed position such that separable members 122 and 124 are held in this position. Mold carrier 120 in its closed position is then positioned on a flat surface such that when the combined structure of model 80 and upper and lower set-up blocks 90 and 92 is positioned in aperture 130, the lower surface 100 of lower set-up block 92 rests against a flat underlying support surface as is depicted in FIG. 7.

Figure 7:
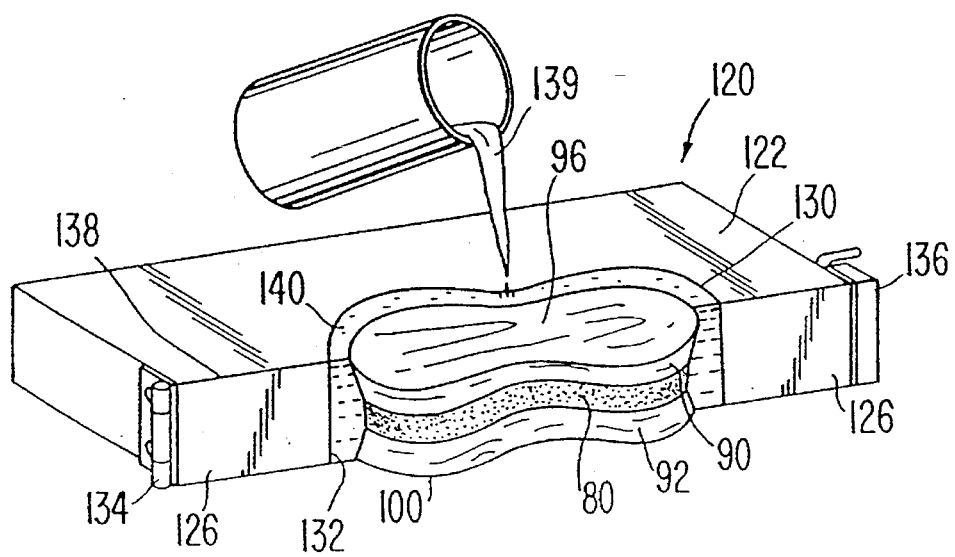
FIG. 7 is a top perspective view of the formed mold carrier with a portion of the mold carrier removed for clarity and demonstrating the forming of a resilient mold insert.

With reference to FIG. 7 which has separable member 124 of mold carrier 120 removed for the sake of clarity, the combination of the model and the set-up block is placed in aperture 130 such that space 140 is created between inner peripheral surface 132 of aperture 130 and outer peripheral surfaces 82, 98, and 104 of model 80, upper set-up block 90, and lower set-up block 92, respectively. Space 140 surrounds the entire outer peripheral surfaces of the model and set-up blocks and as such has a configuration generally corresponding to the shape of model 80. As is apparent, the thickness of space 140 is approximately the same as the thickness of spacing material 108 applied to the combined structure of the model and set-up blocks when mold carrier 120 was formed.

After the combined structure of the model and the set-up blocks is placed in aperture 130 of mold carrier 120, elastomeric material 139 is poured into space 140 such that a resilient mold insert is allowed to form. This step is generally indicated by the reference numeral 68 in FIG. 1. With reference to FIG. 7, a resilient elastomeric material in its liquid state is poured into space 140 around the model and set-up blocks to a level that is adjacent upper surface 96 of upper set-up block 90. Thus, the resilient elastomeric material 139 encases or covers contoured outer peripheral surface 82 of model 80, outer peripheral surface 98 of upper set-up block 90, and outer peripheral surface 104 of lower set-up block 92. FIG. 7 shows the pouring of elastomeric material 139 into space 140.

Resilient elastomeric material 139 poured into space 140 can be of the type that is room temperature vulcanized, for example, silicone manufactured by either General Electric of Waterford, N.Y. or Dow-Corning of Midland, Mich. After elastomeric material 139 is poured into space 140, it is allowed to solidify, set or cure such that resilient mold insert 142 is formed with inner surface 144. Inner surface 144 has the exact impression of the details of contoured outer peripheral surface 82 of model 80. Resilient mold insert 142 is of a continuous nature and completely surrounds the combined structure of the model and set-up blocks.

The combined structure of the model and set-up blocks is removed from resilient mold insert 142 by unlatching latch 136 and partially opening mold carrier 120 such that the pressure is taken off of resilient mold insert 142 and such that resilient mold insert 142 can be deformed to remove the combined structure of the model and set-up blocks. The unlatching and partial opening of the hinged-together separable members 122 and 124 releases the pressure around resilient mold insert 142 sufficiently to allow the combined structure of model 80 and set-up blocks 90 and 92 to be removed from the mold insert by pushing upwards or downwards on the combined structure to deform the resilient material of the mold insert. A demolder or release agent, for example, a silicone spray, can be applied to the outer peripheral surfaces of model 80 and the upper and lower set-up blocks 90 and 92 before resilient elastomeric material 139 is poured in space 140, thus ensuring that the elastomeric material does not stick to these surfaces so that the model and set-up blocks can be removed therefrom.

Figure 8:
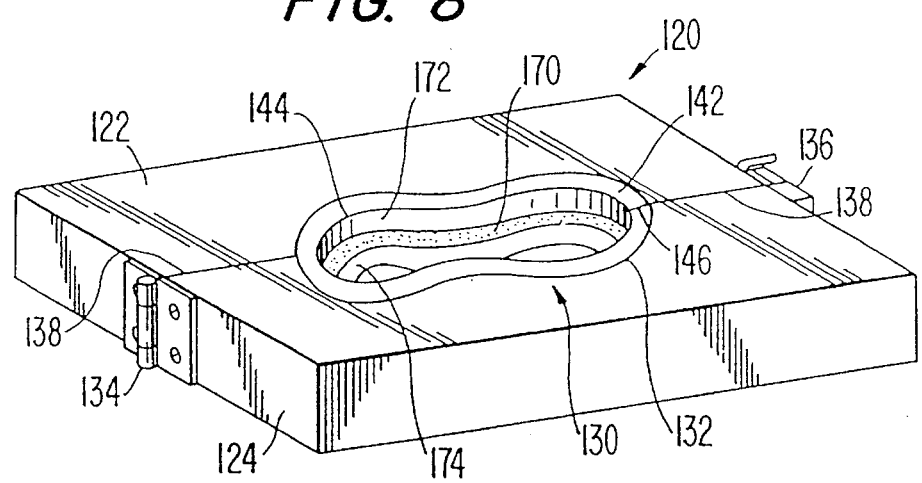
FIG. 8 is a top perspective view of the mold carrier with the resilient mold insert formed in FIG. 7 disposed therein.

With reference to FIG. 8, hinged mold carrier 120 is shown with continuous resilient mold insert 142 disposed along the interior surface of aperture 130. Resilient mold insert 142 can be attached to inner peripheral surface 132 of aperture 130 by a suitable adhesive, for instance SUPER-77®. Resilient mold insert 142 can also be attached to surface 132 and thus mold carrier 120 because of the bonding properties of elastomeric material 139 when it is allowed to solidify in contact with the surface. If resilient mold insert 142 is attached to inner peripheral surface 132 of aperture 130, then the unlatching of latch 136 allows resilient mold insert 142 to deform such that model 80 and set-up blocks 90 and 92 can be removed from mold insert 142 after the mold insert is formed. If resilient mold insert 142 is not bonded or attached to inside peripheral surface 132 of aperture 130 because, for instance, a demolder or release agent was applied to interior surface 132 before the elastomeric material was disposed in space 140, then after mold carrier 120 has been unlatched, the entire resilient mold insert 142 can be removed from the mold carrier and thereafter the model and set-up block removed from the mold insert.

As shown in dashed lines in FIG. 8, resilient mold insert 142 can also be formed with a break 146. Break 146 can generally align with parting line 138 of mold carrier 120. Break 146 can be formed by using release paper when the elastomeric material is used to form the mold insert 142, or break 146 can be cut into the mold insert after it has been formed. In order to release the model and set-up blocks from resilient mold insert 142 with a break 146, mold carrier 120 can be unlatched and separable members 122 and 124 separated such that resilient mold insert 142 also separates along break 146 and is spread apart such that the model and set-up blocks can be easily removed. Resilient mold insert 142 with break 146 can also be unattached to interior peripheral surface 132 of aperture 130 such that the entire mold insert can be removed from the mold carrier with the model and set-up blocks disposed therein and, thereafter, the mold insert parted along break 146 to spread the insert and remove the model and set-up blocks.

As described above, the mold carrier can be formed as one solid member such that it does not have a parting line. If the mold carrier is alternatively formed in this fashion, the resilient mold insert is not bonded or adhesively attached to the inside peripheral surface of the aperture in the mold carrier, thus enabling the resilient mold insert with the model and set-up blocks disposed therein to be completely removed from the mold carrier. Thereafter, the model and set-up blocks can be removed from the mold insert by deforming it. In this alternative mold carrier structure, the elastomeric insert can also be formed as a continuous ring or with a break in it, the break making the removal of the model and set-up blocks easier.

Figure 9:
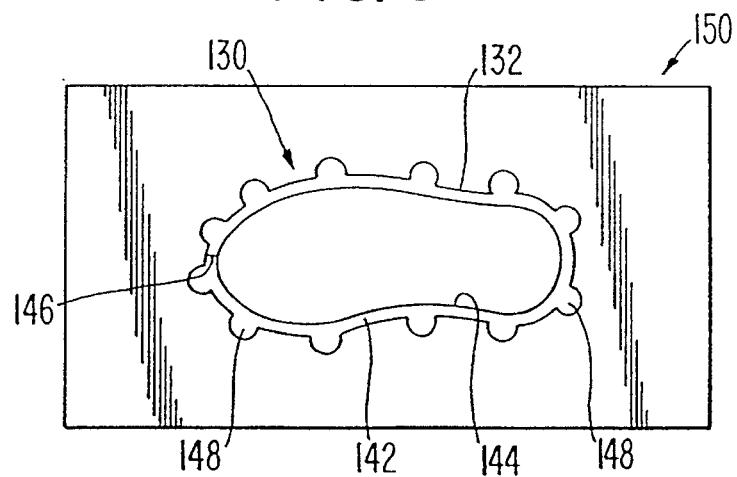
FIG. 9 is a top plan view of an alternative mold carrier with a resilient mold insert disposed therein.

With reference to FIG. 9, an alternative mold carrier is shown. A mold carrier does not have to be formed by allowing liquid epoxy to solidify around the model and set-up blocks covered with the spacing material, but can be milled from any suitable material, for example, aluminum or any other metal. FIG. 9 shows aluminum mold carrier 150 with an aperture 130 milled therein. Aperture 130 has inside peripheral surface 132. Disposed along inside peripheral surface 132 are attaching apertures 148. Aperture 130 is milled in mold carrier 150 such that a small space will exist between inside peripheral surface 132 of aperture 130 and the outer peripheral surfaces of model 80 and set-up blocks 90 and 92 when the model and set-up blocks are disposed in the aperture. Thus, when the combined structure of model 80 and set-up blocks 90 and 92 are disposed in the aperture, a space completely encircles the combination such that an elastomeric material can be poured therein to form a resilient mold insert. FIG. 9 shows resilient mold insert 142 formed in the mold carrier. When resilient mold insert 142 is formed, the elastomeric material poured into the space in between the inside peripheral surface of the aperture and the combined structure of the model and set-up blocks also enters attaching apertures 148. Thus, when the elastomeric material sets or cures, a resilient mold insert 142 shown in FIG. 9 is formed. The protrusion of portions of resilient mold insert 142 into attaching apertures 148 ensures that resilient mold insert 142 will stay in position within mold carrier 150.

In order to remove the model and set-up blocks from the formed mold insert 142 shown in FIG. 9, mold insert 142 can be completely removed from mold carrier 150 by forcing or sliding the mold insert with the model and set-up blocks therein completely out of aperture 130. After mold insert 142 is removed from aperture 130, the model and set-up blocks can easily be removed from the resilient mold insert by deforming the elastomeric material of which it is made. Mold insert 142 disposed in mold carrier 150 can also have a break 146 in it to make removal of the model and set-up blocks easier. As is apparent, if a mold carrier is milled from a suitable material, for example, aluminum, it is not necessary to perform steps 58, 60, 62, and 64 depicted in FIG. 1. In other words, it is not necessary to cover the model and set-up blocks with spacing material and form a mold carrier using in epoxy material.

Figure 10:
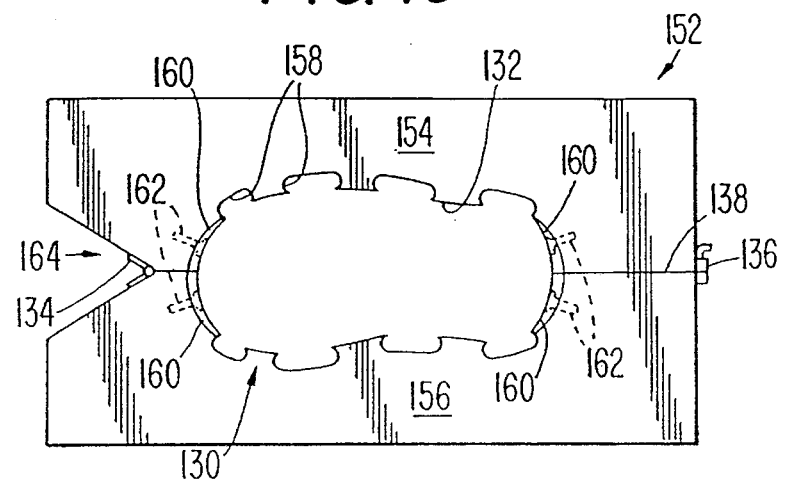
FIG. 10 is a top plan view of a second alternative mold carrier without a resilient mold insert disposed therein.

FIG. 10 shows another alternative mold carrier 152. Mold carrier 152 is again a mold carrier milled from any suitable material. However, in contrast to mold carrier 150 of FIG. 9, mold carrier 152 has two separable members 154 and 156. Mold carrier 152 has hinge 134 and a latch 136. Mold carrier 152 is similar to mold carrier 120 shown in FIG. 8 except for the fact that it is formed by milling instead of being formed using a liquid epoxy material. Mold carrier 152 has aperture 130 with oblong attaching apertures 158 disposed along its interior surface 132. FIG. 10 does not show the resilient mold insert that would be present in aperture 130 of mold carrier 152. Such an elastomeric insert is formed as described above in that a model and set-up block are placed in milled aperture 130 such that a space existed around the outer peripheral surfaces of the mold carrier and set-up blocks into which an elastomeric material is poured and allowed to solidify, set or cure. As the elastomeric material is poured into such a space, the elastomeric material will also enter oblong attaching apertures 158. Oblong attaching apertures 158 serve the same purpose as attaching apertures 148 described above with respect to alternative mold carrier 150 in that they hold the resilient mold insert in place along the inside peripheral surface 132 of aperture 130.

Mold carrier 152 can also have adjusting members 160 which can be bolted to inner peripheral surface 132 of aperture 130 by bolts 162 such that the size of aperture 130 can be adjusted to accommodate midsole designs for different sizes of shoes. The size of adjusting members 160 can vary such that aperture 130 can be adjusted accordingly. Adjusting members 160 are positioned in aperture 130 before the resilient mold insert is formed.

After a resilient mold insert is formed in aperture 130 of mold carrier 152, the model and set-up blocks used to form the mold insert can be removed from the mold insert in the same manner described above with regard to mold carrier 120 shown in FIG. 8. Also, as described above with regard to mold carrier 120 shown in FIG. 8, a mold insert disposed in mold carrier 152 can be a continuous mold insert or can have a break in it. Further, as described with regard to mold carrier 120, a mold insert in mold carrier 152 can either be attached Coy an adhesive or by bonding) or unattached to inner peripheral surface 132 such that if the mold insert is unattached it can be easily removed from mold carrier 152 with the model and set up blocks therein. Mold carrier 152 can also have V-notch 164 in which is disposed hinge 134. V-notch 164 allows hinge 134 to be closer to aperture 130 such that when mold carrier 152 is opened, the amount of stress on a resilient mold insert in aperture 130 will be reduced. In other words, by placing the pivot point of separable members 154 and 156 closer to aperture 130, the stress and tension on a mold insert disposed in aperture 130 is reduced when separable members 154 and 156 are opened. Mold carrier 152 can also be formed with three or more separable members.

In addition to the alternative mold carriers described above, an alternative mold carrier can be made using moveable and slidable parts, or other conventional means that would allow infinite adjustment of an aperture therein for use with different sizes and styles of midsoles.

Further, in all of the mold carriers described above, the inner peripheral surface of the aperture of the mold carrier can be formed such that it is tapered inward from the upper surface of the mold carrier to the lower surface of the mold carrier. This tapering makes it easier to remove the resilient mold insert with the model and setup blocks disposed therein from the aperture when the mold insert is not attached to the inner pefipherad surface.

As described above, various steps and structures can be used to provide a mold carrier with a resilient mold insert. However, each of the alternative mold carriers has resilient mold insert 142 with its impressioned inner surface 144. With reference to FIGS. 8 and 12, inner surface 144 of formed resilient mold insert 142 has three separate impression portions. Portion 170 is an impression of the details of contoured outer peripheral surface 82 of midsole model 80. Portion 172 is an impression of outer peripheral surface 98 of upper set-up block 90. Portion 174 is an impression of outer peripheral surface 104 of lower set-up block 92.

The forming of upper and lower mold plates for a mold carrier will now be described with general reference to mold carrier 120 shown in FIG. 8. However, upper and lower mold plates for the alternative mold carriers described above and shown in FIGS. 9 and 10 can also be formed by the steps described hereafter. The step of forming upper and lower mold plates is generally indicated by reference numeral 70 in FIG. 1. With reference to FIG. 11, the formation of an upper mold plate will be described. Upper set-up block 90 is first removed from midsole model 80 such that only lower set-up block 92 remains attached to model 80. Model 80 with lower set-up block 92 attached thereon is then repositioned in resilient mold insert 142 in mold carrier 120, and mold carrier 120 is then positioned in its closed position such that engaging surfaces 126 and 128 of separable members 122 and 124 are in contact with one another and latch 136 is in its closed latched position. As shown in FIG. 11, upper surface 84 of model 80 is thus visible in aperture 130 and a space is created above upper surface 84 in aperture 130. Additionally, portion 172 of inner surface 144 of resilient mold insert 142 is exposed. Mold carrier 120 is then placed within frame or box 176 which has perimeter wall 178. Perimeter wall 178 normally has upper edge 180 that is slightly above upper surface 182 of mold carrier 120.

An epoxy or elastomeric material 183 can then be poured onto upper surface 182 of mold carrier 120 such that it flows into aperture 130 and covers upper surface 84 of model 80. Elastomeric or epoxy material 183 is poured onto upper surface 182 until it reaches the level of upper edge 180 of frame 176. Epoxy or elastomeric material 183 is then allowed to harden or cure. The material used to form the upper mold plate model can be any other suitable molding material, for example, plaster.

Upper surface 182 of mold carrier 120, upper surface 84 of model 80, and portion 172 of resilient mold insert 142 can be coated with a demolder or release agent before the epoxy, elastomeric, or suitable molding material is poured into frame 176 such that after the epoxy or elastomeric material cures or hardens the mold plate model can be easily detached from these surfaces.

With reference to FIG. 12, an upper mold plate 190 is shown. Upper mold plate 190 is normally formed from a metal material, for example, aluminum. Thus, after the elastomeric or epoxy material 183 solidifies, and is removed from frame 176, an epoxy or elastomeric mold plate model is formed. This epoxy mold plate model is then used to make a female or negative mold model, and from the female mold model an aluminum or metal upper mold plate 190 is formed. Upper mold plate 190 has a mold protrusion 192 which has bottom surface 194. Bottom surface 194 is an impression of upper surface 84 of midsole model 80. With reference to FIG. 12, mold protrusion 192 fits within resilient mold insert 142 when upper mold plate 190 is in a closed position along the upper surface of mold carrier 120.

Lower mold plate 196 is formed in a manner similar to upper mold plate 190, except that mold carrier 120 is flipped over and instead of model 80 and lower set-up block 92 positioned in resilient mold insert 142, model 80 and upper set-up block 90 are positioned in resilient mold insert 142. A lower mold plate model made of an epoxy, elastomeric, or other suitable molding material is then made into an aluminum lower mold plate 196 in the same manner as is described above with regards to upper mold plate 190. Lower mold plate 196 has mold protrusion 198. Mold protrusion 198 has top surface 200 which is an impression of lower surface 86 of model 80. When lower mold plate 196 is in its closed position along the bottom of mold carrier 120, mold protrusion 198 protrudes into resilient mold insert 142.

FIG. 12 shows mold carrier 120 with resilient mold insert 142 disposed therein and upper mold plate 190 and lower mold plate 196 hinged to mold carrier 120 by hinges 202. Upper mold plate 190 and lower mold plate 196 need not be hinged to mold carrier 120 but can also be held in position along the upper and lower surfaces of mold carrier 120 by other means, for example, bolts or clamps. Lower mold plate 196 can also possibly be permanently attached along the lower surface of mold carrier 120.

The entire structure shown in FIG. 12 is generally referred to as a master mold and is designated by the reference numeral 204. Master mold :204 is used to create exact duplicates of model 80. The duplicates created of model 80 are then used to manufacture cast production molds. The duplicates are typically destroyed during the manufacture of the numerous cast production molds. Master mold 204 is typically called a three-part mold because of the hinged mold carrier 120, upper mold plate 190 and lower mold plate 196.

After the master mold has been formed, plaster is normally poured within the master mold to form plaster duplicates of the midsole model. This step is generally indicated by the reference numeral 72 in FIG. 1. With reference to FIG. 12, a plaster duplicate is formed by fast positioning mold carrier 120 in its closed position such that engaging surfaces 126 and 128 of separable members 122 and 124 are in contact and latch 136 is in its closed latched position. Lower mold plate 196 is then positioned along the lower surface of mold carrier 120 such that mold protrusion 198 protrudes into resilient mold insert 142 as indicated by the arrow. Plaster 207 is then poured into resilient mold insert 142. Upper mold plate 190 is then positioned along the upper surface of mold carrier 120 such that mold protrusion 192 protrudes into resilient mold insert 142 as indicated by the arrow. Plaster 207 poured into resilient mold insert 142 is then allowed to solidify with upper and lower mold plates 190 and 196 secured along the upper and lower surfaces of mold carrier 120. After the plaster has cured or set, upper and lower mold plates 190 and 196 can be removed from mold carrier 120 such that a plaster duplicate of model 80 remains in mold carrier 120 and resilient mold insert 142. Latch 136 on mold carrier 120 can then be opened and the separable members 122 and 124 of mold carrier 120 slightly separated such that the pressure is released on resilient mold insert 142. Thus, a plaster duplicate of model 80 can be removed from resilient mold insert 142 by deforming the elastomeric material of which the insert is made. Demolders or release agents can be applied to the surfaces of master mold 204 before plaster is poured therein.

As described above, resilient mold insert 142 can have break 146 in it such that the insert will part along the break when separable members 122 and 124 are separated into an open position, and thus, more easily allow a plaster duplicate to be removed from the resilient mold insert. Additionally, as described above, resilient mold insert 142 may not be bonded or adhesively attached to mold carrier 120. If this is the case, resilient mold insert 142 can be removed from aperture 130 with a plaster duplicate disposed therein after mold carrier 120 is in an open position. After resilient mold insert 142 is removed with the plaster duplicate therein, the plaster duplicate can then be easily removed from the resilient mold insert.

As is apparent, the alternative mold carriers 150 and 152 described herein and shown in FIGS. 9 and 10 can also be fitted with upper and lower mold plates and used to make plaster duplicates of model 80. Plaster duplicates are removed from the mold inserts of mold carriers 150 and 152 in the same manner that the model 80 and set-up blocks 90 and 92 are removed when forming the mold insert.

Although the duplicates of the midsole model 80 are described as being made from plaster, any other suitable material can be used to make the duplicates, for instance, a ceramic material, silicone, or wax.

The plaster duplicates formed by master mold 204 exactly replicate midsole model 80. If a continuous resilient mold insert 142 is used in master mold 204, there are no flash lines formed on the plaster duplicate. If resilient mold insert 142 is made with a single break, only one flash line is present on the plaster duplicate. This is an improvement over prior art methods wherein two flash lines are present on a duplicate and both require removal.

Additionally, each of the plaster duplicates made from master mold 204 will have the exact surface texturing exhibited by midsole model 80. The elastomeric material of which resilient mold insert 142 is made allows a detailed impression of surface textures of the model. Further, because of the resilient properties of the mold insert, the duplicate can be removed from the mold insert without damaging the surface texturing molded onto the duplicate. Moreover, since the plaster duplicates exactly exhibit the surface texturing of the model, there is no need to manually apply the surface texturing to the cast production molds that would subsequently be made from the plaster duplicates.

With reference to FIG. 12, upper and lower mold plates 190 and 196 can be alternatively formed or made without mold protrusions 192 and 198, respectively. Thus, alternative mold plates 190 and 196 can be basically flat plates. Using the alternative flat mold plates with mold carrier 120, a plaster duplicate can be made that duplicates the combined structure 106 of model 80 and set-up blocks 90 and 92. A plaster duplicate of structure 106 can be formed by positioning a flat lower mold plate along the lower surface of mold carrier 120 and pouring plaster into resilient mold insert 142. A flat upper mold plate is then positioned along the top of mold carrier 20 and the plaster is allowed to solidify. The flat upper and lower mold plates are then opened or removed and the plaster duplicate of combined structure 106 is removed from mold carrier 120 in the same manner as the plaster duplicate described above.

As is apparent, plaster duplicates of model 80 combined with only upper set-up block 90 can be formed by using mold carrier 120 with a flat alternative upper model plate 190 (without mold protrusion 192) and with lower mold plate 196 (with mold protusion 198). Further, a plaster duplicate of model 80 combined only with lower set-up block 92 can be formed by using mold carrier 120 with upper mold plate 190 (with mold protrusion 192) and with flat alternative lower mold plate 196 (without mold protrusion 198).

After plaster duplicates have been made of model 80, the plaster duplicates will be used to form production molds for use in manufacturing the finished parts or articles. This step is generally indicated by the reference numeral 74 in FIG. 1. Conventional cast production mold 206 for use in manufacturing finished shoe midsoles is shown in FIG. 13. Cast mold 206 is generally made of aluminum or other suitable metal and has center section 208, upper plate 210 and lower plate 212. Cast mold 206 is manufactured using a plaster duplicate. Generally, the plaster duplicate is positioned in a pour box and molten aluminum is poured around the plaster duplicate such that center section 208 is formed. As is apparent, temporary set-up block can be used to position the plaster duplicate within a pour box such that molten aluminum can surround the duplicate. In this cast molding process, center section 208 typically does not have a part line. Thus, once section 208 is formed around a plaster duplicate, there is no way to remove the plaster duplicate without destroying it. Thus, while the plaster duplicate is encased in center section 208, upper and lower mold plates 210 and 212 can be formed using methods similar to those described above for making upper and lower plates 190 and 196 of master mold 204. Upper mold plate 210 has mold protrusion 214. Mold protrusion 214 has lower surface 216 which contains the impression of the upper surface of the plaster duplicate. Lower mold plate 212 has mold protrusion 218 which has upper surface 220. Upper surface 220 is an impression of the lower surface of the plaster duplicate.

After center section 208 and upper and lower mold plates 210 and 212 are formed, the plaster duplicate used to make them is destroyed to remove it from center section 208. What remains in center section 208 is an aperture 222 with an inner peripheral surface 224. Inner peripheral surface 224 has a portion 226 containing an impression of the outer peripheral surface of the plaster duplicate including surface texturing. Thus, because the plaster duplicate was an exact copy of midsole model 80, the final production cast mold has an exact impression of outer peripheral surface 82 of original midsole model 80.

As discussed above, the surface texturing that is part of the midsole design is already incorporated in cast production mold 206. Thus, there is no need to manually apply the surface texturing to each cast mold made from a plaster duplicate. Therefore, each of the cast molds 206 made from plaster duplicates are consistent with each other and the original three-dimensional midsole model 80.

Although upper and lower mold plates 210 and 212 are shown attached to center section 208 by hinges 228, they can be positioned along the upper and lower surfaces of center section 208 by any other suitable means, for example, clamps or bolts.

As described above, plaster duplicates can be formed of the combined structure 106 of model 80 and set-up blocks 90 and 92. Also as described above, plaster duplicates can be formed of model 80 only with upper set-up block 90 and of model 80 only with lower set-up block 92. These alternative plaster duplicates can also be used to form center section 208 of cast production mold 206 in a manner similar to that described above with regard to the plaster duplicate of model 80.

In order to manufacture a shoe midsole using east production mold 206, lower plate 212 is first positioned along the lower surface of center section 208 as indicated by the arrow. A suitable shoe midsole material is then poured or otherwise positioned in aperture 222. Examples of the type of midsole materials that can be poured, injected or otherwise positioned by conventional means in aperture 222 are ethylene vinyl acetate (EVA) and polyurethane (PU). Further, EVA foam can be compression molded in production mold 206 to form PHYLON®. Upper mold plate 210 is then positioned along the upper surface of center section 208 as indicated by the arrow. The midsole material is then allowed to set or cure. The entire mold 206 can also possibly be heated or cooled to enhance setting and/or curing of the material of choice. After the material has set or cured, the upper and lower mold plates 210 and 212 can be opened or removed. The finished midsole is then removed from aperture 222 of center section 208. Because the midsole is typically made of an elastomeric material, the midsole can be deformed when removing it from aperture 222. Portion 226 of inner surface 224 of aperture 222 is the primary detailed molding surface of cast mold 206 which, as described, is typically made of metal. Cast mold 206 is typically used thousands of times to manufacture midsoles, thus requiring that molding surface 226 be durable, e.g., that it does not deteriorate or shrink and has a long service life.

The plaster duplicates made from master mold 204 are described as being used to make aluminum cast molds. However, the duplicates, whether they are made out of plaster or some other suitable material can also be used to make other types of conventional molds, for example, spin molds, rotational molds, vacuum molds, and injection molds.

One type of molding that master mold 204 with resilient mold insert 142 is useful in is investment molding. In known methods of investment molding, a duplicate is made out of soluble wax using an expensive injection mold. In the present invention, master mold 204 can be used to make the soluble war duplicate, thus, avoiding the need to make a costly injection mold. This is typically done by positioning solid block of soluble wax within the center of resilient mold insert 142 and then filling the rest of the inside of resilient mold insert 142 with liquid soluble wax. The solid block in the center of the mold insert prevent the soluble wax from sagging when it sets. Once the soluble wax sets, it can be removed from master mold 204 in the same manner that plaster duplicates are removed. The soluble wax duplicate can then be used to create a mold made of non-soluble wax. Typically this is done by placing the soluble wax duplicate in a pour box and surrounding it with non-soluble wax. The soluble wax duplicate is then destroyed by dipping the entire unit in a solvent that dissolves the soluble wax duplicate. Thus, all that remains is a non-soluble wax mold. The non-soluble wax mold is then typically dipped into a ceramic material to form a thin rigid mold shell. The non-soluble wax is then removed from the rigid mold shell by heating the rigid mold shell and non-soluble wax therein in an oven. Thus, the non-soluble wax melts leaving only the ceramic shell. Molten metal is then poured into the space within the ceramic shell formerly occupied by the non-soluble wax. The metal is allowed to solidify. The ceramic shell is then broken away and discarded. This creates the final metal production mold from which a part is made.

Figure 14:
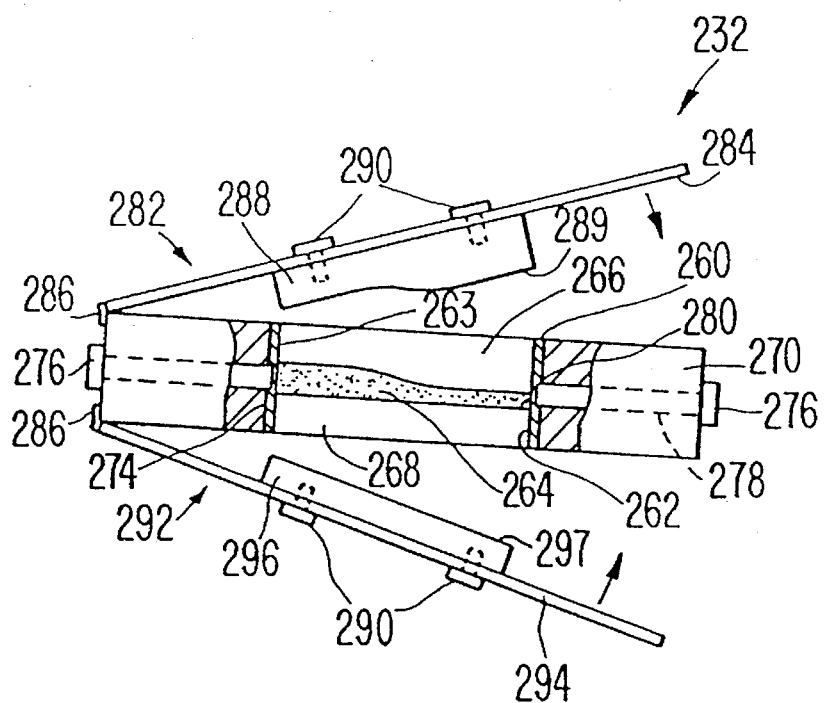
FIG. 14 is a side elevational view and partial section of an alternative production mold made from a duplicate of the combined structure in FIG. 3 and including a metal mold insert.

With reference to FIGS. 14–18 an alternative cast production mold and the steps to make such a mold will be described. The completed alternative cast production mold is generally indicated by the reference numeral 232 as shown in FIG. 14. Cast production mold 232 is formed using a plaster duplicate made in master mold 204 in the manner described above. More particularly, the first step in making cast production mold 232 is to form a plaster duplicate 234 that duplicates the combined structure 106 of model 80 and set-up blocks 90 and 92 in the manner described above. Plaster duplicate 234 of combined structure 106 has an outer peripheral surface 236 which replicates the outer peripheral surface 82 of midsole model 80, the outer peripheral surface 98 of upper setup block 90, and the outer peripheral surface 104 of lower set-up block 92. Plaster duplicate 234 also has flat upper surface 238 and flat lower surface 240. In other words, plaster duplicate 234 is a one-piece mass of plaster formed to replicate combined structure 106 shown in FIG. 3.

Figure 15:
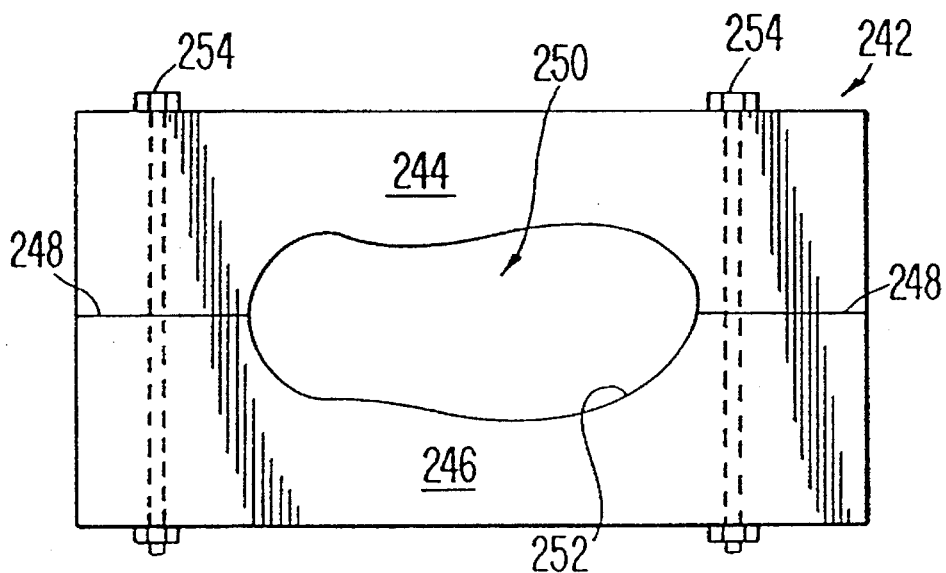
FIG. 15 is a top plan view of a mold base used to make the metal mold insert of the production mold of FIG. 14.

With reference to FIG. 15, a temporary mold base 242 is formed of plaster. Mold base 242 can also be formed of any other suitable material, for example ceramic material. Mold base 242 can be formed in any suitable manner, for example by milling plaster into the form of the mold base or by pouring and allowing the plaster to harden in the shape of the mold base. Mold base 242 has separable members 244 and 246. Separable members 244 and 246 can be held in a closed position by bolts 254, clamps or other suitable means such that aperture 250 and part line 248 are formed. Part line 248 indicates where separable members 244 and 246 engage one another. Formed aperture 250 has a shape that is generally the same as the perimeter shape of plaster duplicate 234 except that it is enlarged therefrom. Aperture 250 has inner peripheral surface 252. One portion of inner peripheral portion 252 is located on separable member 244 and the other portion of inner peripheral surface 252 is located on separable member 246.

Figure 16:
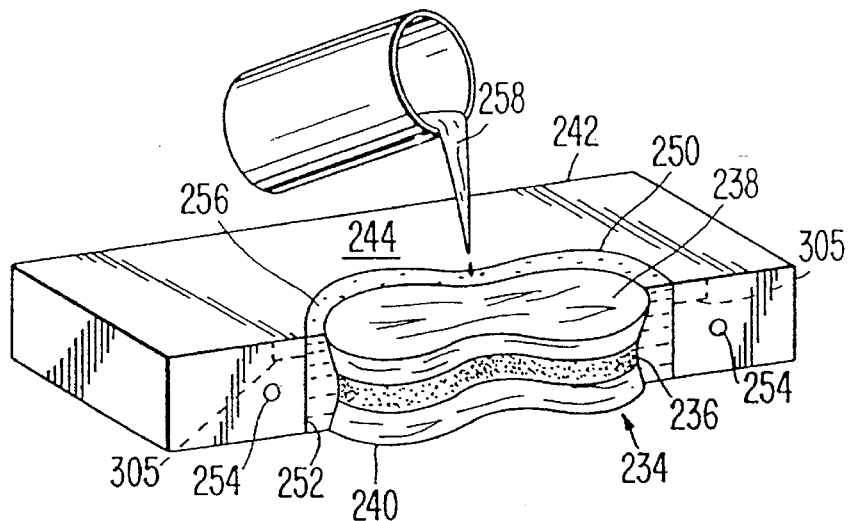
FIG. 16 is top perspective view of the mold base of FIG. 15 with a portion of the mold base removed for clarity and demonstrating the forming of a metal mold insert.

With reference to FIG. 16, plaster duplicate 234 is then placed in aperture 250 when mold base 242 is in its closed position. FIG. 16 shows plaster duplicate 234 disposed in aperture 250 with separable member 246 left out for the sake of clarity. Flat lower surface 240 of plaster duplicate 234 rests upon the flat underlying support surface on which mold base 242 rests. Plaster duplicate 234 is placed in aperture 250 such that space 256 is created between inner peripheral surface 252 of aperture 250 and outer peripheral surface 236 of plaster duplicate 234. Space 256 surrounds the entire outer peripheral surface 236 and as such has a configuration generally corresponding to the shape of plaster duplicate 234. As described above, aperture 250 was formed such that it has a shape that is enlarged from and generally similar to the perimeter shape of plaster duplicate 234, thus creating space 256 when plaster duplicate 234 is placed in aperture 250. Space 256 is preferably approximately ½ inch in width.

After plaster duplicate 234 is placed in aperture 250 of mold base 242, molten metal material 258 is poured into space 256 around plaster duplicate 234 to a level that is adjacent upper surface 238 of plaster duplicate 234. Thus, the molten metal material 258 encases or covers the contoured outer peripheral surface 236 of plaster duplicate 234 as shown in FIG. 16. Molten metal material 258 can be of any suitable type, for example steel or aluminum.

After metal material 258 is poured into space 256, it is allowed to solidify such that a metal production mold insert 260 is formed with inner surface 262. Inner surface 262 has the exact impression of the details of outer peripheral surface 236 of plaster duplicate 234, and thus has the exact impression of the details of outer peripheral surface 82 of model 80. Metal production mold insert 260 is of a continuous nature and completely surrounds plaster duplicate 234. As is apparent, production mold insert 260 does not have to be formed of a metal material, but can be formed of any other suitably rigid, durable material, for example, non-stick teflon or epoxy.

Production mold insert 260 is removed from mold base 242 by loosening bolts 254 and separating separable members 244 and 246 along part line 248. Further, because mold base 242 can be made of plaster, it can be broken and/or destroyed when production mold insert 260 is removed. Plaster duplicate 234 is removed from the interior of production mold insert 260 by breaking the duplicate such that it is destroyed and can easily be removed.

Figure 17:
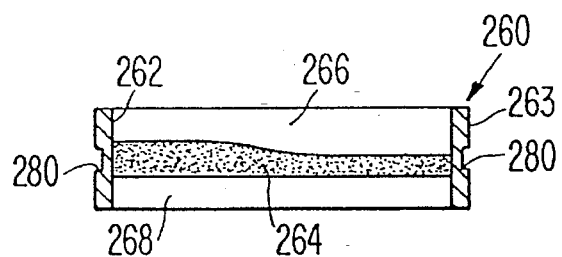
FIG. 17 is a longitudinal sectional view of the metal mold insert formed in FIG. 16.

With reference to FIG. 17, metal production mold insert 260 is shown in longitudinal cross section after it has been removed from mold base 242 and after plaster duplicate 234 has been removed from its interior. Inner surface 262 of mold insert 260 has three separate impression portions. Portion 264 is an impression of the details of contoured outer peripheral surface 82 of midsole model 80. Portion 266 is an impression of smooth outer peripheral surface 98 of upper set-up block 90. Portion 268 is an impression of smooth outer peripheral surface 104 of lower set-up block 92.

Figure 18:
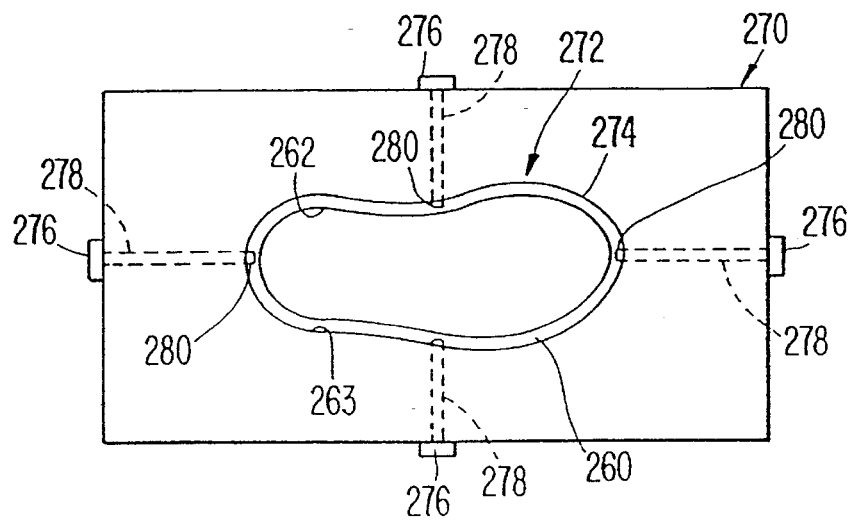
FIG. 18 is a top plan view of the center section of the production mold of FIG. 14 with a metal mold insert disposed therein.

With reference to FIG. 18, production mold insert 260 is then inserted into reusable center section 270 of cast production mold 232. Center section 270 has aperture 272 for receiving mold insert 260. Aperture 272 has the same general shape and size as aperture 250 of mold base 242 that was used to form mold insert 260 such that mold insert 260 fits within aperture 272. Center section 270 is typically a solid block of material with aperture 272 formed therein by any suitable means, for example machining. Center section 270 is typically made out of a metal material, for example aluminum or steel. Production mold insert 260 is positioned in aperture 272 such that outer peripheral surface 263 of mold insert 260 engages inner peripheral surface 274 of aperture 272. Production mold insert 260 has the same height as center section 270 such that when the mold insert is inserted in aperture 272 the upper and lower surfaces of the mold insert are generally flushed with the upper and lower surfaces of the center section, respectively, as shown in FIG. 14.

Metal production mold insert 260 can be secured in aperture 272 by bolts 276 which extend through bores 278 in center section 270 and into threaded holes 280 in mold insert 260. Mold insert 260 can also be secured in aperture 272 by any other suitable mechanical means, for example, dowels or clamps, or other conventional means, for example, glue or adhesive.

With reference to FIG. 14, upper mold plate 282 can be made in two separate members. A base member 284 is generally a flat plate and is rotatably connected to center section 270 by hinge 286. A mold protusion member 288 can be bolted to base 284 by bolts 290. Mold protrusion 288 is formed such that it is a replica of upper set-up block 90 and such that its lower surface 289 can be used to form the upper surface of a midsole formed in cast production mold 232. Mold protrusion 288 can be formed by a computerized machining process similar to that described above with regard to model 80 except that upper set-up block 90 would be used as the three-dimensional model. Mold protrusion 288 can also be formed by creating a female or negative mold of upper set-up block 90, and from the female mold making mold protusion 288 such that it is a replica of upper set-up block 90. After mold protrusion 288 is formed, it is attached to base 284 by bolts 290.

Lower mold plate 292 has base member 294 and mold protrusion 296. Base 294 and mold protusion 296 are made in a similar manner to base 284 and mold protusion 288 of upper mold plate 282, except that lower set-up block 92 is used as a model for mold protrusion 296 instead of upper set-up block 90. Thus, mold protrusion 296 is a replica of lower set-up block 92 and after it is made it can be bolted to base 294 by bolts 290. Mold protusion 296 has an upper surface 297 for forming the bottom of a midsole made in east production mold 232. Base 294 is also rotatably connected to center section 270 by hinge 286.

Base 284 and mold protrusion 288 of upper mold plate 282 and base 294 and mold protrusion 296 of lower mold plate 292 are preferably made of a metal material, for example aluminum or steel. However, bases 284 and 294 and mold protrusions 288 and 296 can also be made of any other suitable material, for example resins or epoxies. Further, upper and lower mold plates 282 and 292 need not be made of a two-part construction, but can be made in the manner described herein with regard to master mold 204 or production mold 206.

With reference to FIG. 14, the completed alternative east production mold 232 is shown. Shoe midsoles can be manufactured using east production mold 232 in a manner similar to that used to make midsoles in east production mold 206 described above. More particularly, lower mold plate 292 is first positioned along the lower surface of center section 270 as indicated by the arrow. A suitable shoe midsole material is then poured or otherwise positioned in metal production insert 260. Examples of the type of midsole materials that can be poured, injected or otherwise positioned by conventional means in metal production mold insert 260 are EVA and PU. Also, EVA foam can be compression molded in production mold 232 to form PHYLON®. Upper mold plate 282 is then positioned along the upper surface of center section 270 as indicated by the arrow. The midsole material is then allowed to set or cure. After the material has set or cured, the upper and lower mold plates 282 and 292 can be opened or removed. The finished midsole is then removed from metal production mold insert 260. Because the midsole is typically made of an elastomeric material, the midsole can be deformed when removing it from mold insert 260.

Because of the different heating and cooling requirements for different materials used to make midsoles or other footwear components, the material of which center section 270 is made of can vary with the type of material used to make a midsole/component therein. For example, if rubber is molded in center section 270, center section 270 will preferably be made of steel. If PU or EVA is the midsole material, center section 270 will preferably be made of aluminum. Furthermore, center section 270 can have a plurality of vents disposed therein such that a midsole contained in metal mold insert 260 can be heated, cooled, or held at a constant temperature. Further, center section 270 can be interlaced with conduits such that a fluid can be introduced into the conduits to control the temperature of a forming midsole in metal mold insert 260.

Cast production mold 232 offers the advantage of being able to be used to manufacture, for example, different shoe model midsoles by simply: (1) changing metal mold insert 260, (2) changing mold protrusion 288 on base 284, and (3) changing mold protrusion 296 on base 294. Thus, center section 270, base 284 of upper mold plate 282, and base 294 of lower mold 292 can be used over and over again to manufacture different shoe model midsoles. In order to change cast production mold 232 for manufacture of a different shoe model midsole, the existing metal mold insert in center section 270 can be removed by loosening bolts 276 and a new metal mold insert placed in center section 270 and secured therein by tightening bolts 276. Further, existing mold protrusions 288 and 296 can be removed by loosening bolts 290, and new mold protrusions attached to the upper and lower mold plates by bolts 290.

Figure 19:
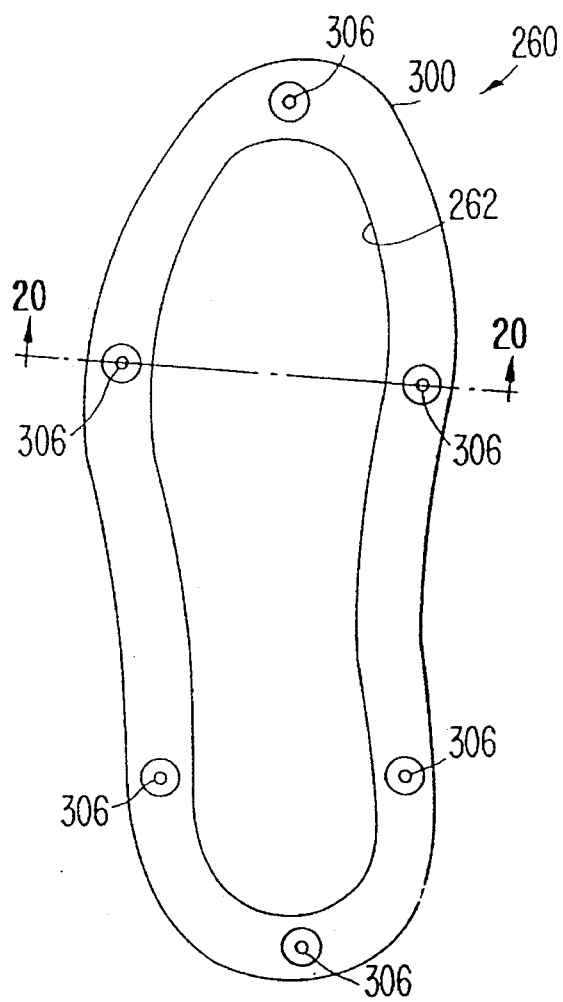
FIG. 19 is a top plan view of a metal mold insert similar to that shown in FIG. 17, but showing an alternative structure for securing the mold insert to the center section of the production mold of FIG. 14.
Figure 20:
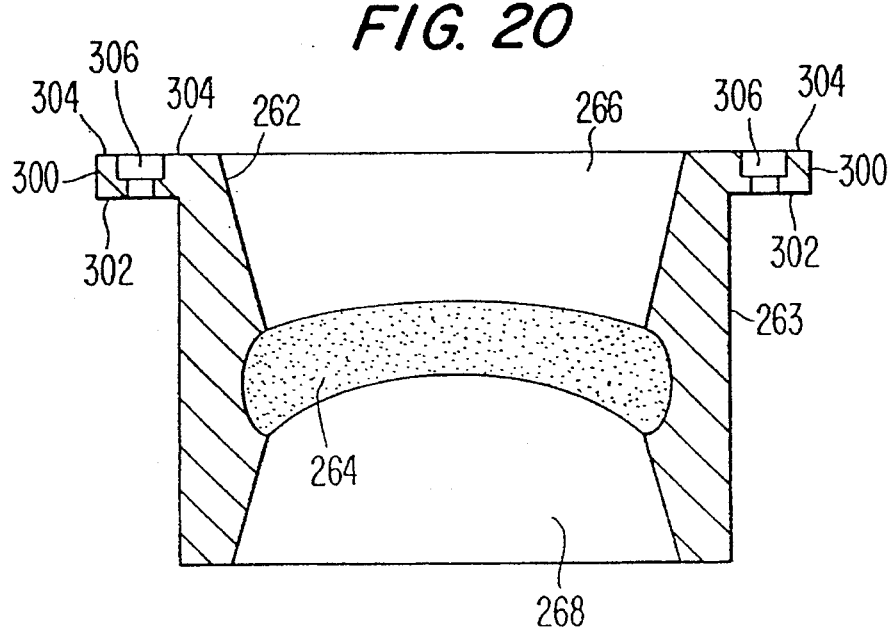
FIG. 20 is a section view taken along line 20—20 of FIG. 19.

With reference to FIGS. 19–22, an alternative manner of securing mold insert 260 to center section 270 of cast production mold 232 will be described. With reference to FIGS. 19 and 20, mold insert 260 can be formed with flange portion 300 which surrounds the entire upper perimeter of mold insert 260. Flange 300 has lower surface 302 and upper surface 304. Vertical bores 306 are spaced along flange 300 and can be used instead of threaded holes 280 to attach mold insert 260 to center section 270. Thus, mold insert 260 does not have to have threaded holes 280 formed therein when mold insert 260 has flange 300. Flange portion 300 is preferably approximately ½ inches wide and preferably approximately ⅜ inches thick.

With general reference to FIG. 16, flange 300 can be formed when mold insert 260 is formed. In order to form flange 300, aperture 250 of mold base 242 can be provided with a cutout ledge 305 (as generally shown in dashed lines in FIG. 16). Cutout ledge 305 extends around the upper perimeter edge of aperture 250. Cutout ledge 305 can have the approximate dimensions of flange 300. Thus, when metal material 258 (or any other suitable material) is poured into space 256 to a level that is adjacent upper surface 238 of plaster duplicate 234, metal material 258 will also flow over cutout ledge 305 such that when the metal material solidifies, flange 300 is formed simultaneously with mold insert 260. Alternatively, the flange 300 can be formed on mold insert 260 by a machining process.

Figure 21:
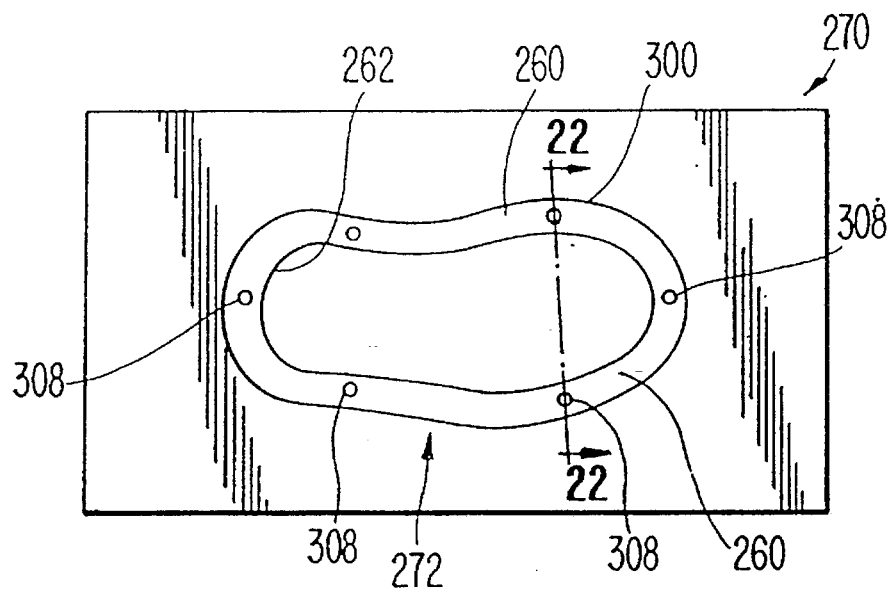
FIG. 21 is a top plan view of a center section of the production mold of FIG. 14 with the metal mold insert of FIG. 19 disposed therein.
Figure 22:
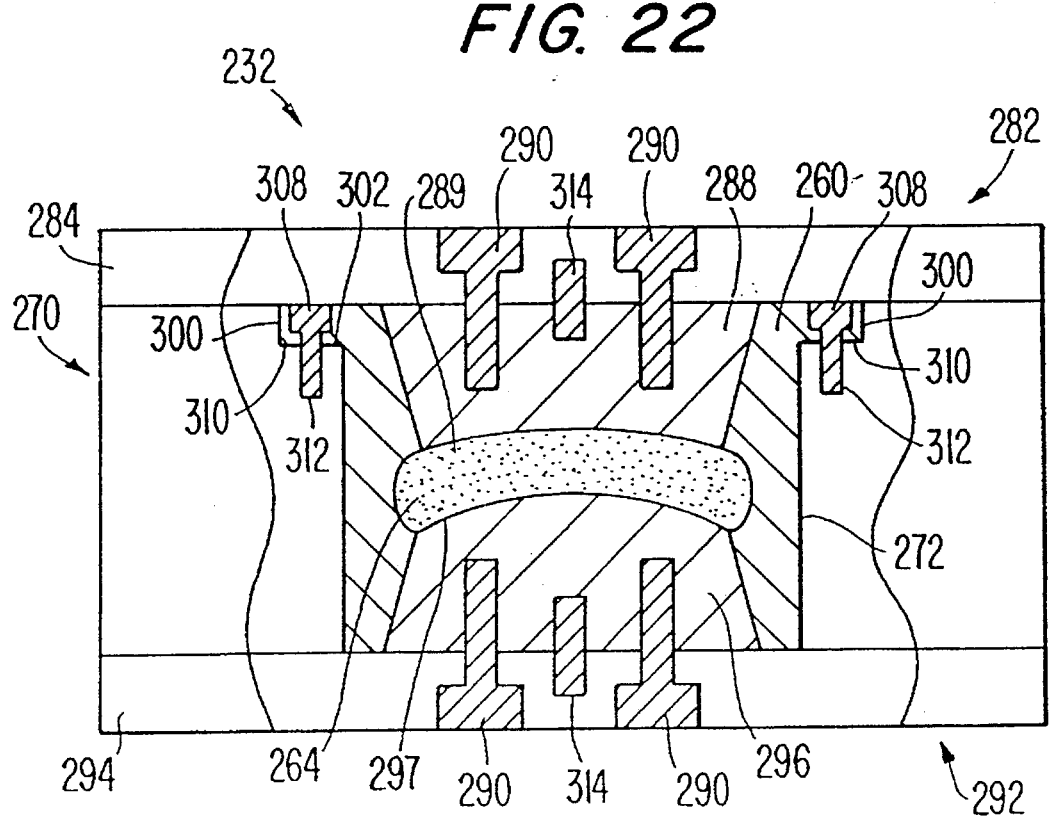
FIG. 22 is a rear elevational view of the production mold of FIG. 14 with the metal mold insert of FIG. 19 disposed therein.
Figure 23:
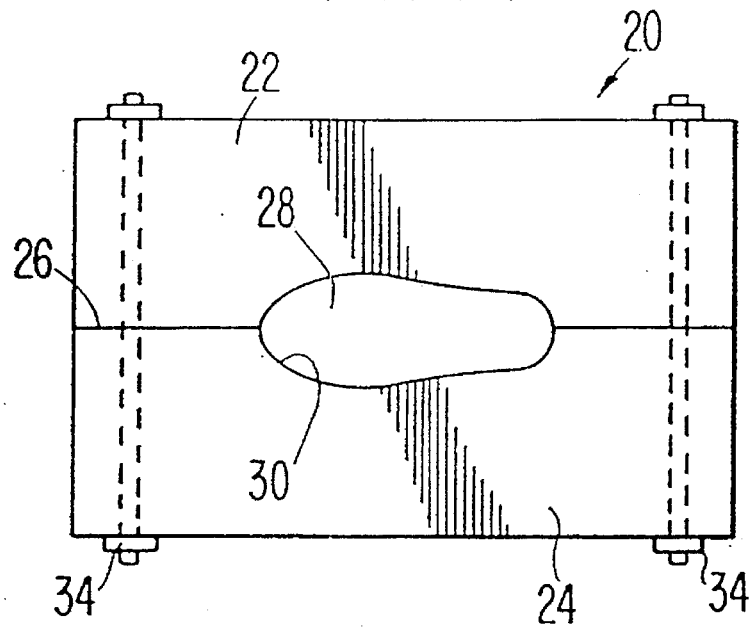
FIG. 23 is a top plan view of a prior art mold used to make model duplicates.
Figure 24:
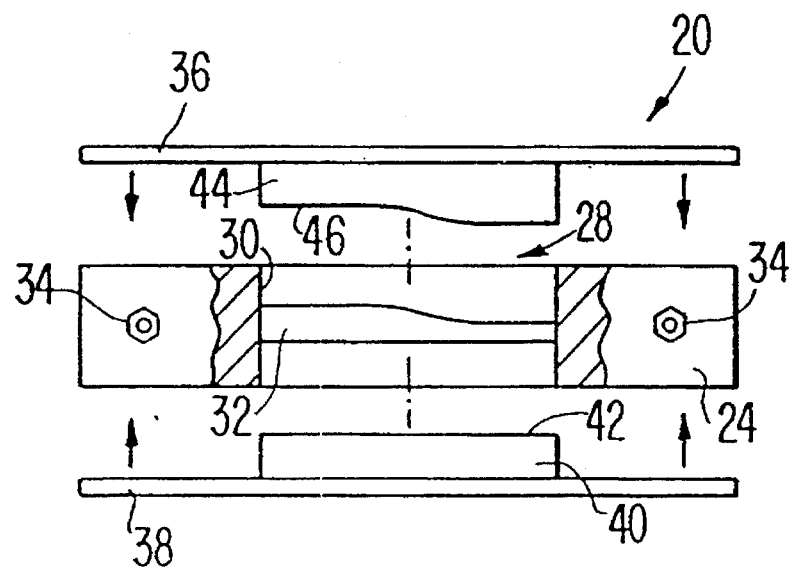
FIG. 24 is a side elevational view and partial section of the mold shown in FIG. 23.

With reference to FIGS. 21 and 22, mold insert 260 with flange 300 is shown attached to center section 270 of production mold 232 by bolts 308. Center section 270 can be made with supporting ledge 310 extending around the upper perimeter edge of aperture 272. Supporting ledge 310 has the same general configuration as flange 300 such that when mold insert 260 is disposed in aperture 272, lower surface 302 of flange 300 engages supporting ledge 310. Supporting ledge 310 has a plurality of threaded holes 312 which correspond to each of bores 306 of flange 300. Thus, bolts 308 can be positioned in bores 306 and threaded holes 312 and then tightened to secure mold insert 260 to center section 270. Further, holes 312 need not be threaded such that dowels or pins can be used to secure mold insert 260 to center section 270. When center section 270 is formed with supporting ledge 310 and threaded holes 312 to accommodate a mold insert with flange 300, center section 270 need not have bores 278 formed therein. FIGS. 21 and 22 show center section 270 without bores 278 formed therein. As is apparent, in order to remove mold insert 260 from center section 270, bolts 308 are simply loosened and the mold insert removed.

With reference to FIG. 22, cast production mold 232 is shown in a closed position such that upper mold plate 282 is positioned along the upper surface of center section 270 and such that lower mold plate 292 is positioned along the lower surface of center section 270. In this close position, mold protrusion 288 is positioned in the upper part of metal mold insert 260 and lower mold protrusion 296 is positioned in the lower part of metal mold insert 260. Thus, when a suitable midsole material is placed in production mold 232 and the mold is closed, the midsole material engages lower surface 289 of mold protrusion 288, portion 264 of inner peripheral surface 262 of mold insert 260, and upper surface 297 of mold insert 296 to thus form a midsole. With further reference to FIG. 22, aligning pins 314 can be used to ensure that mold protrusions 288 and 296 are properly aligned on base plates 284 and 294, respectively.

Numerous characteristics and advantages of the invention have been set forth in the foregoing description, together with details of the structure and function of the invention, and the novel features thereof are pointed out in the attendant claims. The disclosure, is illustrative only and changes may be made in detail, especially in matters of shape, size and arrangement of the parts and steps within the principals of the invention as indicated by the broad general meaning of the terms in which the appended claims are expressed.

We claim:

1. A method of making a part from a destructible duplicate of the part design comprising the steps of:

forming a mold base having an aperture therein, said aperture having a configuration generally corresponding to the shape of the duplicate;

positioning the duplicate within said aperture such that a space is created between an inner peripheral surface of said aperture and an outer peripheral surface of the duplicate;

pouring a first material in its liquid state into said space such that said first material substantially covers the outer peripheral surface of the duplicate;

allowing said first material to solidify in said space such that a rigid single part mold insert is formed, said rigid mold insert forming an impression of the outer peripheral surface of the duplicate;

removing said rigid mold insert from said mold base;

removing the destructible duplicate from said rigid mold insert by destroying the duplicate;

forming a production mold having an aperture therein, said aperture having a configuration generally corresponding to the shape of the outer peripheral surface of said rigid mold insert;

placing said rigid mold insert into said aperture of said production mold;

placing a second material into said rigid mold insert when said rigid mold insert is disposed in said aperture of said production mold;

allowing said second material to set in said rigid mold insert such that a part is formed; and removing said part from said rigid mold insert.

2. The method of claim 1 wherein said space created between said inner peripheral surface of said aperture of said mold base and the outer peripheral surface of said duplicate surrounds the entire outer peripheral surface of the duplicate and has a configuration generally corresponding to the shape of the duplicate.

3. The method of claim 2 wherein said first material is poured into said space such that said fast material substantially surrounds the entire outer peripheral surface of the duplicate.

4. The method of claim 3 wherein said rigid mold insert is formed as a continuous ring.

5. The method of claim 1 wherein said first material is a metal material such that a rigid metal mold insert is formed.

6. The method of claim 5 wherein said metal material is steel.

7. The method of claim 1 wherein said duplicate is a replica of a model of the part with upper and lower set-up block disposed thereon.

8. The method of claim 1 wherein said duplicate is made of plaster.

9. The method of claim 7 further comprising the step of forming an upper mold plate for said production mold, said upper mold plate formed by;

making a replica of said upper set-up block; and attaching said upper set-up block replica to a base plate.

10. The method of claim 7 further comprising the step of forming a lower mold plate for said production mold, said lower mold plate formed by;

making a replica of said lower set-up block; and attaching said lower set-up block replica to a base plate.

11. A method of making a part from a destructible duplicate of the part design comprising the steps of:

forming a mold base having an aperture therein, said aperture having a configuration generally corresponding to the shape of the duplicate;

positioning the duplicate within said aperture such that a space is created between an inner peripheral surface of said aperture and an outer peripheral surface of the duplicate;

pouring a first material in its liquid state into said space such that said first material substantially covers the outer peripheral surface of the duplicate;

allowing said first material to solidify in said space such that a rigid mold insert is formed, said rigid mold insert forming an impression of the outer peripheral surface of the duplicate;

removing said rigid mold insert from said mold base;

removing the destructible duplicate from said rigid mold insert by destroying the duplicate;

forming a production mold having an aperture therein, said aperture having a configuration generally corresponding to the shape of the outer peripheral surface of said rigid mold insert;

placing said rigid mold insert into said aperture of said production mold;

placing a second material into said rigid mold insert when said rigid mold insert is disposed in said aperture of said production mold;

allowing said second material to set in said rigid mold insert such that a part is formed; and removing said part from said rigid mold insert;

wherein, said duplicate is a replica of a model of the part with at least one of upper and lower set-up blocks disposed thereon.

12. The method of claim 11 wherein said duplicate is a replica of a model of the part with upper and lower set-up blocks disposed thereon.

13. The method of claim 12 further comprising the step of forming an upper mold plate for said production mold, said upper mold plate formed by:

making a replica of said upper set-up block; and attaching said upper set-up block replica to a base plate.

14. The method of claim 12 further comprising the step of forming a lower mold plate for said production mold, said lower mold plate formed by:

making a replica of said lower set-up block; and attaching said lower set-up block replica to a base plate.

* * * * *